(12) United States Patent
Maejima

(10) Patent No.: US 6,715,431 B1
(45) Date of Patent: Apr. 6, 2004

(54) MULTIFUNCTIONAL DISPOSAL APPARATUS

(75) Inventor: Takashi Maejima, 3326, Asahidai 3-chome, Ishioka city, Ibaraki 315-0038 (JP)

(73) Assignees: Fumio Maejima, Niihari-gun (JP); Takashi Maejima, Ishioka (JP)

( * ) Notice: Subject to any disclaimer, the term of this patent is extended or adjusted under 35 U.S.C. 154(b) by 133 days.

(21) Appl. No.: 09/719,095

(22) PCT Filed: Jun. 16, 2000

(86) PCT No.: PCT/JP00/03934

§ 371 (c)(1),
(2), (4) Date: Nov. 15, 2001

(87) PCT Pub. No.: WO01/11289

PCT Pub. Date: Feb. 15, 2001

(30) Foreign Application Priority Data

Aug. 6, 1999 (JP) .............................. 11-223970

(51) Int. Cl.[7] .......................... F23G 5/04; F23L 15/00; F23B 5/04; F23J 15/00
(52) U.S. Cl. ................... 110/233; 110/210; 110/203; 110/211; 110/224; 110/208; 110/216; 110/302
(58) Field of Search ................. 110/203, 205, 110/207, 208, 210, 211, 212, 215, 216, 217, 233, 246, 254, 258, 295, 302, 303, 304, 214, 342, 345, 346

(56) References Cited

U.S. PATENT DOCUMENTS 3,859,933 A * 1/1975 Von Klenck ................ 110/8 R
3,884,162 A * 5/1975 Schuster ..................... 110/8 R
4,465,022 A * 8/1984 Virr ........................... 122/4 D
4,467,732 A * 8/1984 Taniguchi ................... 110/259
4,751,887 A * 6/1988 Terry et al. ................. 110/246
4,948,362 A * 8/1990 Baird ......................... 432/14
4,958,578 A * 9/1990 Houser ....................... 110/246
5,190,672 A * 3/1993 Coenen et al. .............. 210/770
5,337,684 A * 8/1994 Summers .................... 110/346
5,535,687 A * 7/1996 Khanna ...................... 110/345
5,797,332 A * 8/1998 Keller et al. ................ 110/226
5,913,273 A * 6/1999 Maejima ..................... 110/248
6,182,584 B1 * 2/2001 Gaudio ....................... 110/229

* cited by examiner

Primary Examiner—K. B. Rinehart
(74) Attorney, Agent, or Firm—Westerman, Hattori, Daniels & Adrian, LLP

(57) ABSTRACT

The present invention relates to a multifunctional disposal apparatus for performing disposal by incineration, desiccation, fusion, degradation, ash melting and others on an object to be disposed such as raw refuse, general garbage, sludge, expanded polystyrene and others produced from a manufacturing plant, a service providing facility, a wholesale market, a general firm, a general store, a general house and others.

[Structure] In a multifunctional disposal apparatus comprising: a dry combustion furnace; a kiln furnace; a first smoke feeding portion; a second smoke feeding portion; a smoke combustion portion; a dust filter portion; a second smoke feeding portion; an air heating portion; and a cooling tank portion, the present invention has such structure as that a flow of air is generated in one direction from the cooling tank to the second smoke feeding portion to form a vacuum.

5 Claims, 25 Drawing Sheets

Microbial Degradation

Pyrolysis

Low-temperature Drying

Indirect hot-air Drying

Direct hot-air Drying

Carbonization

Incineration

Polymer Melting

Ash Melting

MULTIFUNCTIONAL DISPOSAL APPARATUS

BACKGROUND OF THE INVENTION

1. Field of the Invention

The present invention relates to a multifunctional disposal apparatus for performing disposal by incineration, drying, melting, degradation, ash melting, and the like, on an object to be disposed of, such as raw refuse, general garbage, sludge, expanded polystyrene, and the like, produced from a manufacturing plant, a service providing facility, a wholesale market, a general firm, a general store, a general house, and the like.

2. Description of the Prior Art

Conventionally, an object to be disposed of, such as the raw refuse and the general garbage produced from a manufacturing plant, a service providing facility, a wholesale market, a general firm, a general store, a general house, and the like is directly incinerated and dried in an incinerator.

Further, an object to be disposed of, such as the sludge, is dried and then incinerated to be land filled, and any expanded polystyrene (so-called styrene foam) is collected to be degraded by a processor having a dedicated compressive degradation apparatus.

However, since a general incinerator adopts a mode for forcibly sending air to burn an object to be disposed of, repetition of the high and low furnace temperature by oxide combustion causes combustion smoke, and the exhaust gas containing harmful substances, such as dioxin, to be emitted. Further, since the incinerated ash obtained from combustion also includes harmful substances, the ash generated from combustion can not be reused.

That is, the sludge or raw refuse containing a large amount of water, the highly combustible paper or wood, the plastic bags of convenience stores or the general plastic refuse generating a toxic gas, transparent wrap film which can be considered as a cause of generation of dioxin, plastic bottles, general burnable refuse such as expanded polystyrene are often put together in the incinerator, and a large content of water lowers the combustion temperature, which accelerates generation of dioxin.

There are incinerators which prohibit incineration of the plastic bottles depending on the structures of the incinerators in respective autonomous communities. In such a case, the plastic bottles are separated to be collected.

It is therefore an object of the present invention to provide a multifunctional disposal apparatus having functions according to types and post-disposal apparatus having functions according to types and post-disposal usages of an object of disposal such as raw refuse, sludge, generated garbage or a polymer-based, object, such as expanded polystyrene produced from houses or firms, i.e., the apparatus capable of performing disposal by (1) microbial degradation, (2) pyrolysis, (3) low-temperature drying, (4) indirect hot-air drying, (5) direct hot-air drying, (6) carbonization, (7) incineration, (8) polymer melting and (9) ash melting. In other words, an object melting and (9) ash melting. In other words an object of the present invention is to provide a multifunctional disposal apparatus which can dry the general garbage, the raw refuse, the sludge and others, which can not be incinerated when they contain a large amount of water, in the multifunction disposal apparatus to be then carbonized and incinerated irrespective of the water content.

SUMMARY OF THE INVENTION

The present invention provides a multifunctional disposal apparatus comprising: a dry combustion furnace; a kiln furnace; a first smoke feeding portion; a second smoke feeding portion; a smoke combustion portion; a dust filter portion; an air heating portion; a cooling tank portion, wherein a flow of air is generated in one direction from the cooling tank portion to the second smoke feeding portion to obtain a vacuum state.

DETAILED DESCRIPTION OF THE PREFERRED EMBODIMENTS

Figure 1:
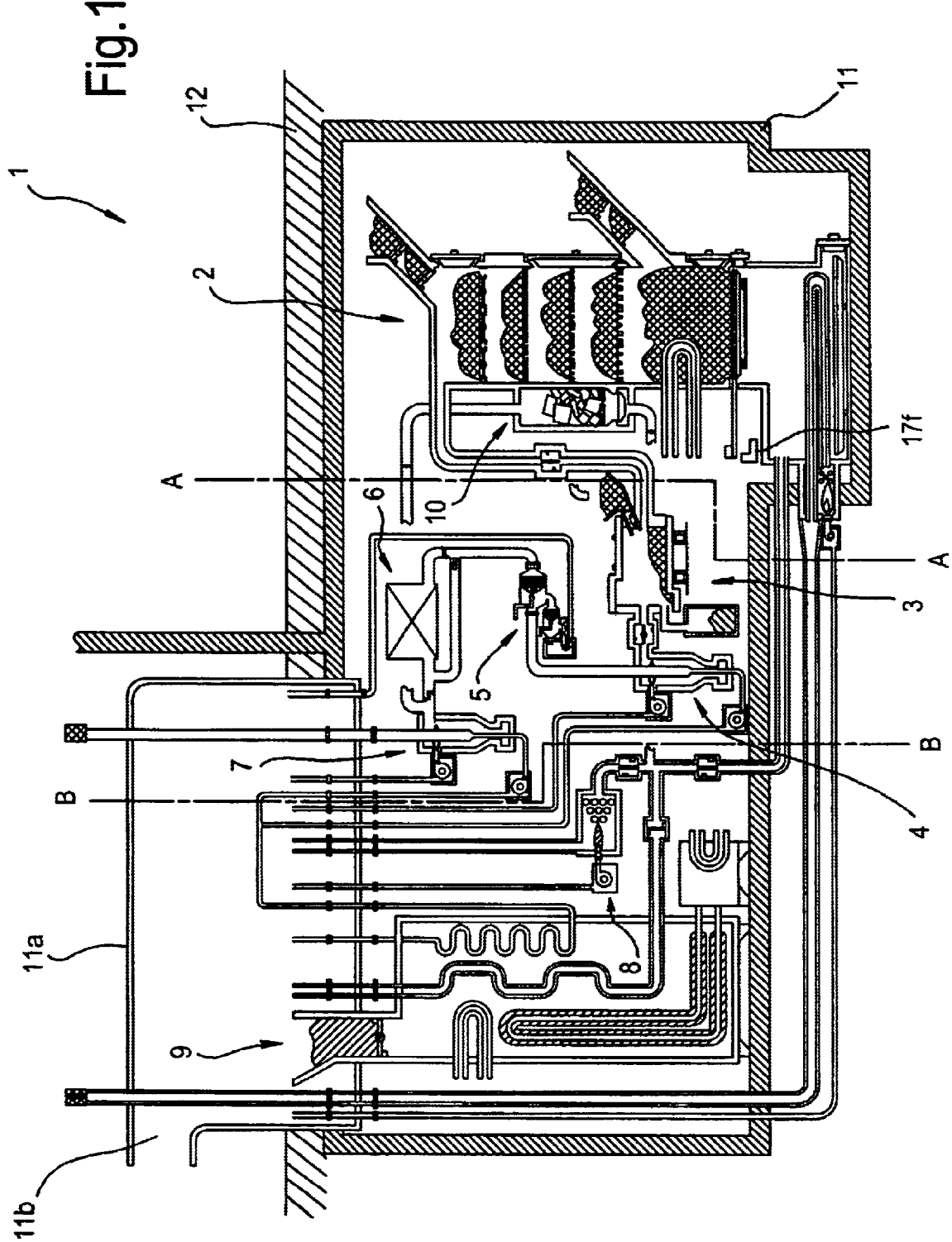
FIG. 1 is a cross-sectional view showing an overall multifunctional disposal apparatus according to the present invention.

A multifunctional disposal apparatus according to the present invention will now be described in detail with reference to the accompanying drawings. A multifunctional disposal apparatus 1 according to the present invention includes: a dry combustion furnace 2; a kiln furnace 3; a first smoke feeding portion 4; a smoke combustion portion 5; a dust filter portion 6; a second smoke feeding portion 7; an air heating portion 8; a cooling tank portion 9; and a melting device 10 (incinerated ash melting). The entire multifunctional disposal apparatus 1 is accommodated in a frame body 11 having an air intake box 11a and embedded in the soil under a ground 12 so that outside air can be led from an air intake opening 11b.

The air intake box 11a is connected to a burner, a blower, a heater, a combustion heating device for liquid hydrogen, and the like; provided to the dry combustion furnace 2, the first smoke feeding portion, the smoke combustion portion 5, the second smoke feeding portion 7 and the air heating portion 8 in order to collectively take in the fresh air required for the combustion heating device. The air intake opening 11b is provided to the air intake box 11a. A filter may be provided to the air intake opening 11b so as not to absorb dusts.

The multifunctional disposal apparatus 1 may not be embedded in the soil under the ground 12 but the respective devices 2 to 10 may be directly installed in a plant, and the like, without setting these devises 2 to 10 in the the frame body 11. When directly installing the respective devices 2 to 10 in a plant, and the like, a heat shield plate, and the like, may be appropriately provided around these devices since extremely high heat is generated. Further, a facility for improving air permeability may be installed.

In FIGS. 2 to 5, the detailed description will now be given as to the respective devices 2 to 10, i.e., the dry combustion furnace 2, the kiln furnace 3, the first smoke feeding portion 4, the smoke combustion portion 5, the dust filter portion 6, the second smoke feeding portion 7, the air heating portion 8, the cooling tank portion 9, the melting device 10 (an incinerated ash melting device).

Figure 2:
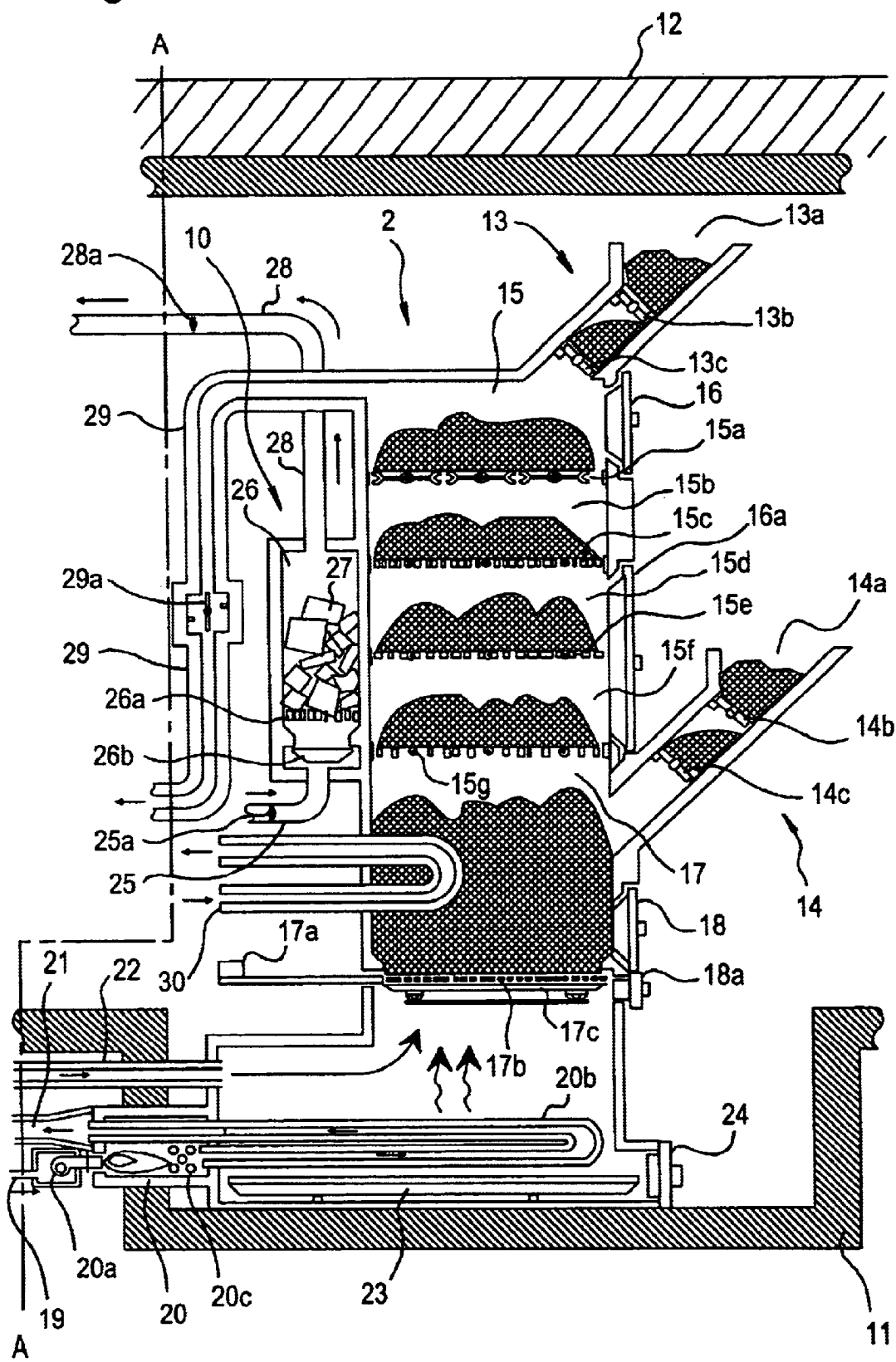
FIG. 2 is an enlarged view showing a drying combustion furnace and a fusion device of the multifunctional disposal apparatus.

FIG. 2 is a partially enlarged view of the multifunctional disposal apparatus according to the present invention, showing the dry combustion furnace and the melting device provided on the right side of the multifunctional disposal apparatus taken along the A—A line in FIG. 1 in the enlarged manner. This apparatus 1 adopts the method for performing disposal by adjusting a temperature of a mixed waste material (expanded polystyrene, polymer, paper waste, raw refuse, sludge and others), melting the polystyrene and drying the raw refuse and the sludge to be thereafter incinerated.

The dry combustion furnace 2 includes a first dry chamber 15, a second dry chamber 15b, a third dry chamber 15d, a fourth dry chamber 15f and a combustion chamber (dry chamber) 17 from the top in the mentioned order. A raw refuse/sludge input portion 13 is provided on the upper part of the first dry chamber 15, and a general garbage input portion 14 is provided on the upper part of the combustion chamber 17. The respective dry chambers 15, 15b, 15d, 15f and the combustion chamber (dry chamber) 17 may not be separately formed in multiple stages but they may be formed as one chamber. When the respective dry chambers 15, 15b, 15d, 15f and the combustion chamber (dry chamber) 17 are separately formed in multiple stages, the throughput is improved.

The raw refuse input portion 13 and the generated garbage input portion 14 have input openings 13a and 14a which are opened in the funnel-like shape respectively, and first opening/closing valves 13b and 14b and second opening/closing valves 13c and 14c are provided inside thereof as shown in FIG. 2. The first opening/closing valves 13b and 14b are used for moving down to the second opening/closing valves 13c and 14c an appropriate amount of the raw refuse or sludge and the general garbage inputted from the input openings 13a and 14a. The second opening/closing valves 13c and 14c inputs the raw refuse, the sludge and the general garbage together with the first dry chamber 15 and the combustion chamber 17.

It is needless to say that the waste material is not restricted only to the raw refuse, sludge and others inputted to the input opening 13a, and any burnable refuse or any other object to be disposed which has contained a large amount of water but dried may be also included. The general garbage is not restricted to those inputted in the input opening 14a, but any dried burnable object to be disposed which hardly contains water may be also included.

The refuse having a large water content is inputted from the raw refuse/sludge input portions 13 into the first dry chamber 15, and dried in the first combustion chamber to the fourth dry chambers 15, 15b, 15d and 15f in the mentioned order to be then burned in the combustion chamber 17. In addition, the refuse having no water content is not subjected to a dry process but inputted from the general garbage input portion 14 into the combustion chamber 17 to be burned.

Further, a plurality of dry plates 15a so set as to be capable of swiveling are provided on the bottom face of the first dry chamber 15. As shown in FIG. 2, the long-plate-like dry plates 15a are provided so as to be rotatable around the shaft. When all the dry plates 15a face the horizontal direction, the raw refuse or the sludge can be mounted on the dry plates 15a. On the other hand, all the dry plates 15a rotate to face the vertical direction, the raw refuse, the sludge and the like can be moved down into the second dry chamber 15 from gaps between the respective dry plates 15a.

The raw refuse, the sludge and the like mounted on the dry plates 15a are dried by the hot air rising from the second dry chamber 15b on the lower side of the first dry chamber 15. Of course, a gap may be formed and provided between the respective dry plates 15a or between the dry plates 15a and the wall surface. The dry plates 15a can rotate 180 degrees. The rear sides of the dry plates 15a can be also used, and both the front surface and the rear surface can serve as the dry plate. The both surfaces are alternately used to prevent the dry plates 15a from being distorted by heat. When the dry plates 15a and grating plates 15c, 15e and 15g rotate 180 degrees, the raw refuse, the sludge and others can be uniformly dropped.

As similar to the first dry chamber 15, a plurality of grating plates 15c which are so set as to be capable of swiveling are provided on the bottom face of the second dry chamber 15b; grating plates 15e having the similar structures are provided in the third dry chamber 15d; and grating plates 15g having the similar structures are provided in the fourth dry chamber 15f. Of course, the respective grating plates 15c, 15e and 15g may have a rotatable structure or a fixed structure that does not allow rotation or swiveling.

When the respective grating plates 15c, 15e and 15g swivel or rotate around the shaft, the raw refuse, the sludge and others in the respective dry chambers 15b, 15d and 15f can be caused to drop in the lower dry chambers 15d, 15f or the combustion chamber 17.

In order to cause the raw refuse, the sludge and others to drop in the second dry chamber, the third dry chamber and the fourth dry chamber 15b, 15d and 15f, and the combustion chamber 17 in the mentioned order, providing the plural dry plates 15a or the multiple grating plates 15c, 15e and 5g which are not one plate enables uniform agitation when the raw refuse, the sludge and others drop, thereby realizing even drying.

As shown in FIG. 2, a width between the respective gratings is different among the grating plates 15c, the grating plates 15e and the grating plates 15g, namely, a gap between the gratings of the grating plates 15c is narrowest; a gap between the gratings of the grating plates 15e is larger than a gap between the gratings of the grating plates 15c; and a gap between the gratings of the grating plates 15g is larger than a gap between the gratings of the grating plate 15e. That is because the raw refuse, the sludge and others which fall downwards are gradually dried in the second dry chamber 15b, the third dry chamber 15d and the fourth dry chamber 15f in the mentioned order as they drop. They become fine particles having no water content, and the raw refuse, the sludge and others dried on the top faces of the grating plates 15c, 15e and 15g hence pass through the space between the gratings to drop into the lower dry chambers without swiveling the dry plates.

The raw refuse, the sludge and others which have passed the first dry chamber 15 to the fourth dry chamber 15f to be dried and the general garbage inputted from the general garbage input portion 14 are collected in the combustion chamber 17 provided below the fourth dry chamber 15f. A fire grate 17b is provided on the bottom face of the combustion chamber 17 and the refuse is mounted on the fire grate 17b.

A heating chamber 20 for reserving the air heated by a heating burner 20a and a heat radiating tube 20b connected to the heating chamber 20 are provided below the combustion chamber 17; an air leading tube 19 for sending the fresh air to the heating burner 20a is connected to the heating burner 20a; an exhaust tube 21 for emitting the hot air in the heat radiating tube 20 into the outside of the dry combustion furnace 2 is connected to the heat radiating 20b; and an air supplying tube 22 for taking in the heated fresh air or the fresh air is connected/to the dry combustion furnace 2.

A plurality of thermal storage mediums 20c consisting of ceramics or a heat resistant metal are provided in the heating chamber 20. When the thermal storage mediums 20c are heated by the heating burner 20a, the heat of the heating burner 20a is stored. Further, when heating is carried out beyond the capacity of the thermal storage mediums 20c, an infrared ray or heat is emitted so that the heating chamber 20 can be maintained at a high temperature.

Figure 5:
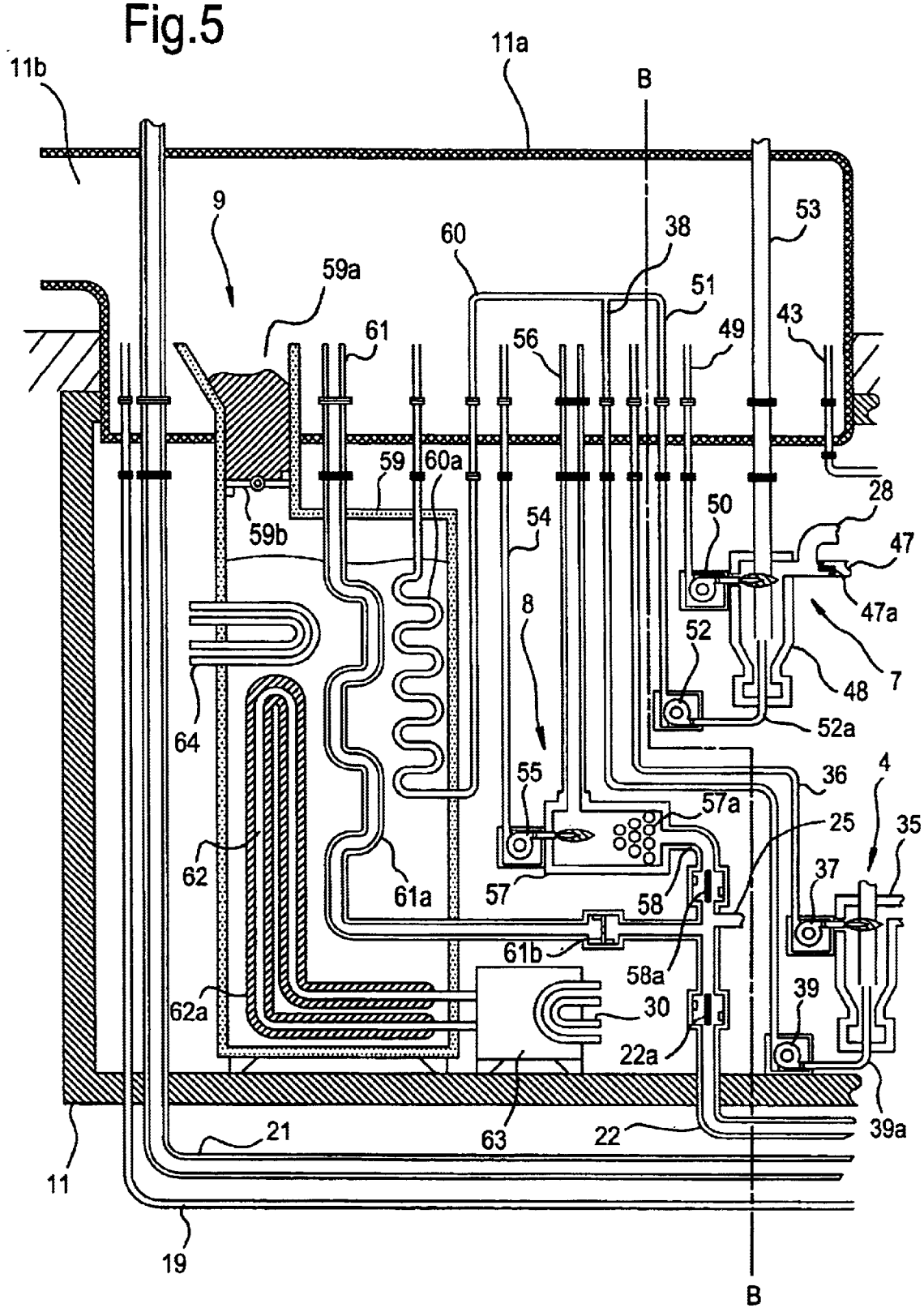
FIG. 5 is an enlarged view of an air heating portion and a cooling tank portion of the multifunctional disposal apparatus.

The air leading tube 19 and the exhaust tube 21 communicate with the air intake box 11a provided to the frame body 11 of the multifunctional disposal apparatus 1. As shown in FIG. 5, an opening/closing valve 22a is provided to the air supplying tube 22 and connected to both an air supplying tube 58 of the air heating portion 8 and a air cooling tube 61 of the cooling tank portion 9 so that the heated fresh air or the cooled fresh air, or the mixed air of the heated fresh air and the cooled fresh air can be led into the dry combustion furnace 2.

The air supplying tube 22 for taking in the heated fresh air or the fresh air is connected because the fresh air is sent from the air leading tube 19 to the heating burner 20a but oxygen for incineration is hardly contained in the air heated by the heating burner 20a. The heat radiating tube 20b does not directly send the air heated by the heating burner 20a into the combustion chamber 17 but heats the fresh air around the heat radiating tube 20b by the heat radiating tube 20b to transmit the high heat to the combustion chamber 17.

When the combustion chamber 17 is also simultaneously dried by indirect heat, the heat emitted from the heat radiating tube 20b and the fresh air can dry the refuse in the combustion chamber 17 at a high temperature, and the hot air from the heat radiating tube 20b and the heat for drying the refuse can dry the raw refuse or the sludge in the first dry chamber 15 to the fourth dry chamber 15f.

The smoke generated by the hot air from the heat radiating tube 20b and incineration of the refuse is exhausted to a smoke exhaust tube 29 connected to the upper portion of the first dry chamber. An opening/closing valve 29a is provided in the middle part of the smoke leading tube 29, and the smoke leading tube 29 is connected to the kiln furnace 3. The kiln furnace 3 may be connected to the dry combustion furnace 2.

Figure 3:
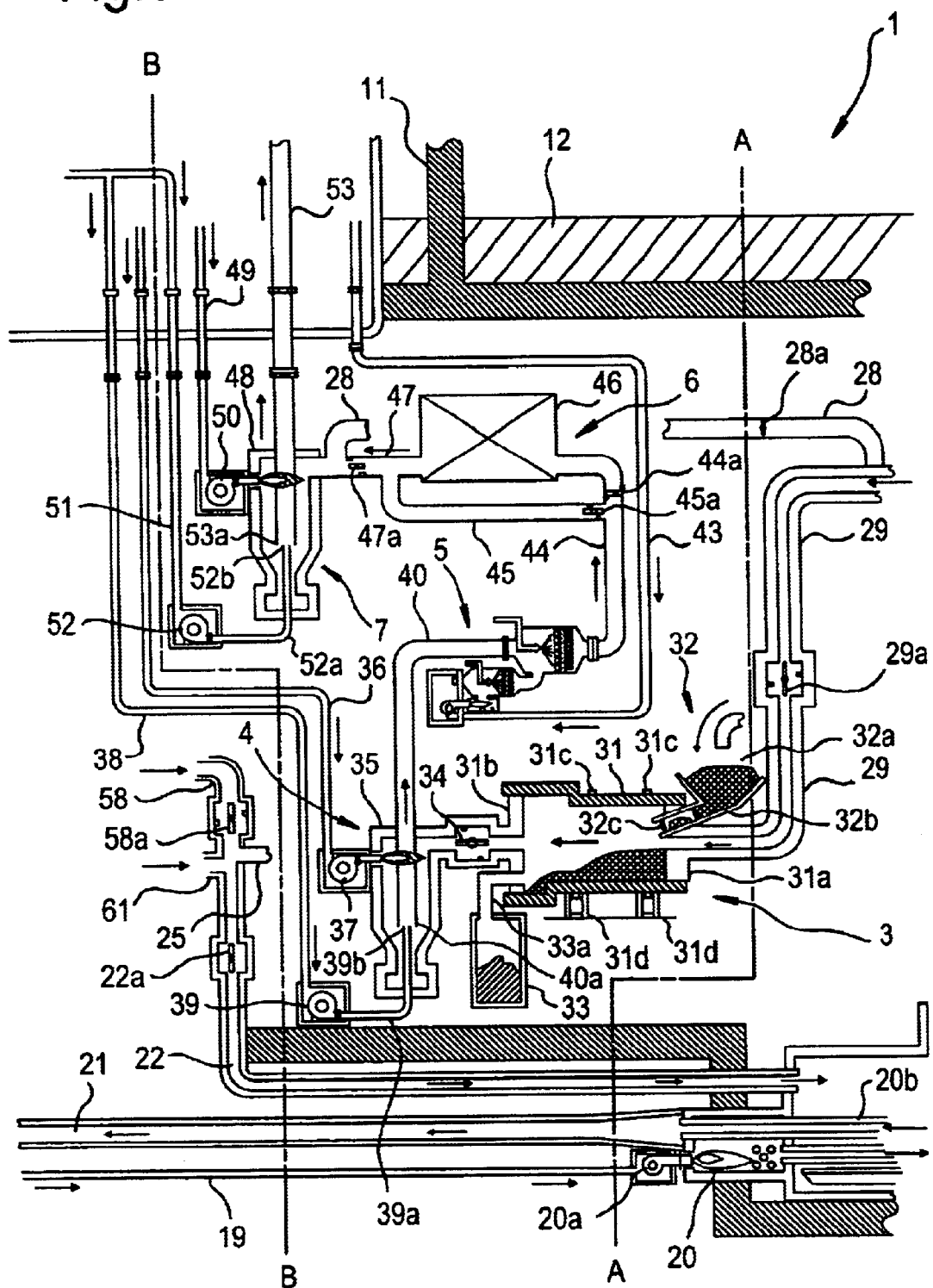
FIG. 3 is an enlarged view showing a kiln furnace, a first smoke feeding portion, a smoke combustion portion, a dust filter portion and a second smoke feeding portion of the multifunctional disposal apparatus.

As shown in FIG. 3, the dry combustion furnace 2 is connected to the kiln furnace 3 through the smoke leading tube 29, and the kiln furnace 3 is connected to the first smoke feeding portion 4. When the blower 39 is driven to forcibly send the air from a tip 39b of the air supplying tube 39a and a lower end 40a of a flue 40, the inside of a cyclone furnace 35 of the first smoke feeding portion 4 forms a vacuum, and the air or the smoke in the dry combustion furnace 2 is then absorbed in the smoke feeding tube 29. Therefore, since the inside of the dry combustion furnace 2 also forms a vacuum, the fresh air is absorbed from the air supplying tube 22.

As shown in FIG. 2, a vibrator 17a is provided to the fire grate 17b set on the bottom of the combustion chamber 17. Upon completion of incineration of the refuse in the combustion chamber 17, the vibrator 17a is driven to vibrate the fire grate 17b so that the incinerated ash lying on the fire grate 17b can be shaken off into an ash pan 17c. The fire grate 17b may have a structure allowing attachment of the vibrator 17a thereto and rotation. 5 Further, a belt conveyer may be disposed instead of the ash pan 17c.

As shown in FIG. 2, to the lower portion of the heat radiating tube 20b is provided a funnel fume pan 23 for collecting a funnel fume generated from incineration of the refuse or a funnel fume and the like produced when the dry combustion furnace 2 is used as a carbonization device.

As shown in FIG. 2, doors 16, 16a and 18 which can be opened/closed for cleaning for removing residues, maintenance, or inspection for confirming the combustion state are provided to the first dry chamber 15, the third dry chamber 15d, the fourth dry chamber 15f, the combustion chamber 17 and others. There are also provided an ash access door 18a for taking in or out the ash pan 17c and a funnel fume access door 24 for taking in or out the funnel fume pan 23, and others.

Wheels and rails may be provided to the lower surfaces of the ash pan 17c, the funnel fume pan 23 and others so that the ash pan 17c and the funnel fume pan 23 can be taken in or out from the ash access door 18a and the funnel fume access door 24 in order to remove the ash or the funnel fume to the outside of the dry combustion chamber 2.

A circulation tube 30 for utilizing the combustion heat generated from incineration of the refuse is provided to the combustion chamber 17, as shown in FIG. 2.

The circulation tube 30 is connected to the circulation tube 30 of a freezing machine 63.

The circulation tube 30 is used to drive the freezing machine 63 employed in the cooling tank portion 9. That is, it permeates water and drives the freezing machine 63 by using the high-temperature water or steam.

As shown in FIG. 2, a belt conveyer may be provided to the input openings 13a and 14a of the raw refuse/sludge input portion 13 and the general garbage input portion 14 so that the raw refuse, the sludge, the general garbage and others can be automatically conveyed and inputted to the input openings 13a and 14a.

All the valves 13b, 13c, 14b, 14c, 22a and 29a provided to the dry combustion furnace 2, all the grating plates 15a, 15c, 15e and 15g, the fire grate 17b, the vibrator 17a and the heating burner 20a may be automatically controlled by a computer and the like. Sensors for detecting a combustion temperature, an exhaust temperature, a water content and others may be provided to the dry chambers 15, 15b, 15d and 15f, the combustion chamber 17, the heating chamber 20 and others to enable automatic control using the computer.

The melting device 10 is made up of an air supplying tube 25, a melting tank 26, an exhaust tube 28 and others. A pan 26b is provided under the melting tank 26, and a grating plate 26a for mounting polyethylene foam or a polymer-based substance thereon is provided above the pan 26b.

The expanded polystyrene (so-called expanded polystyrene), the polymer-based substance and the like 27 is mounted on the top face of the grating plate 26a, and the opening/closing valve 25a provided to the air supplying tube 25 is opened to lead the hot air supplied from the air heating portion 8 into the melting tank 26.

When the heat transmitted from the wall of the dry combustion furnace 2 is utilized to perform fusion, only a small amount of the hot air from the heating portion 8 is advantageously required.

Since the led hot air has an extremely high temperature, it melts the expanded polystyrene, the polymer substance and the like 27, and the molten liquid substance is reserved in the pan 26b. An agglomerate of polystyrene which is the molten substance reserved in the pan 26 is the polymer-based substance, and it is hence suitable to be reused.

The hot air which has molten the expanded polystyrene and the polymer-based substance 27 passes through the exhaust tube 28 having the opening/closing valve 28a to be fed to the second smoke feeding portion 7.

As shown in FIG. 3, it is burned in the burner 50 at an extremely high temperature and again incinerated in the cyclone furnace 48. Thereafter, it is quickly cooled down to be exhausted from a funnel draft 53 to the outside of the second smoke feeding portion 7.

A computer and the like may be used to automatically control driving of the opening/closing valves 25a and 28a provided to the melting device 10. A sensor for detecting a temperature and the like may be provided to the melting tank 26 for allowing the automatic control using a computer.

Figure 4:
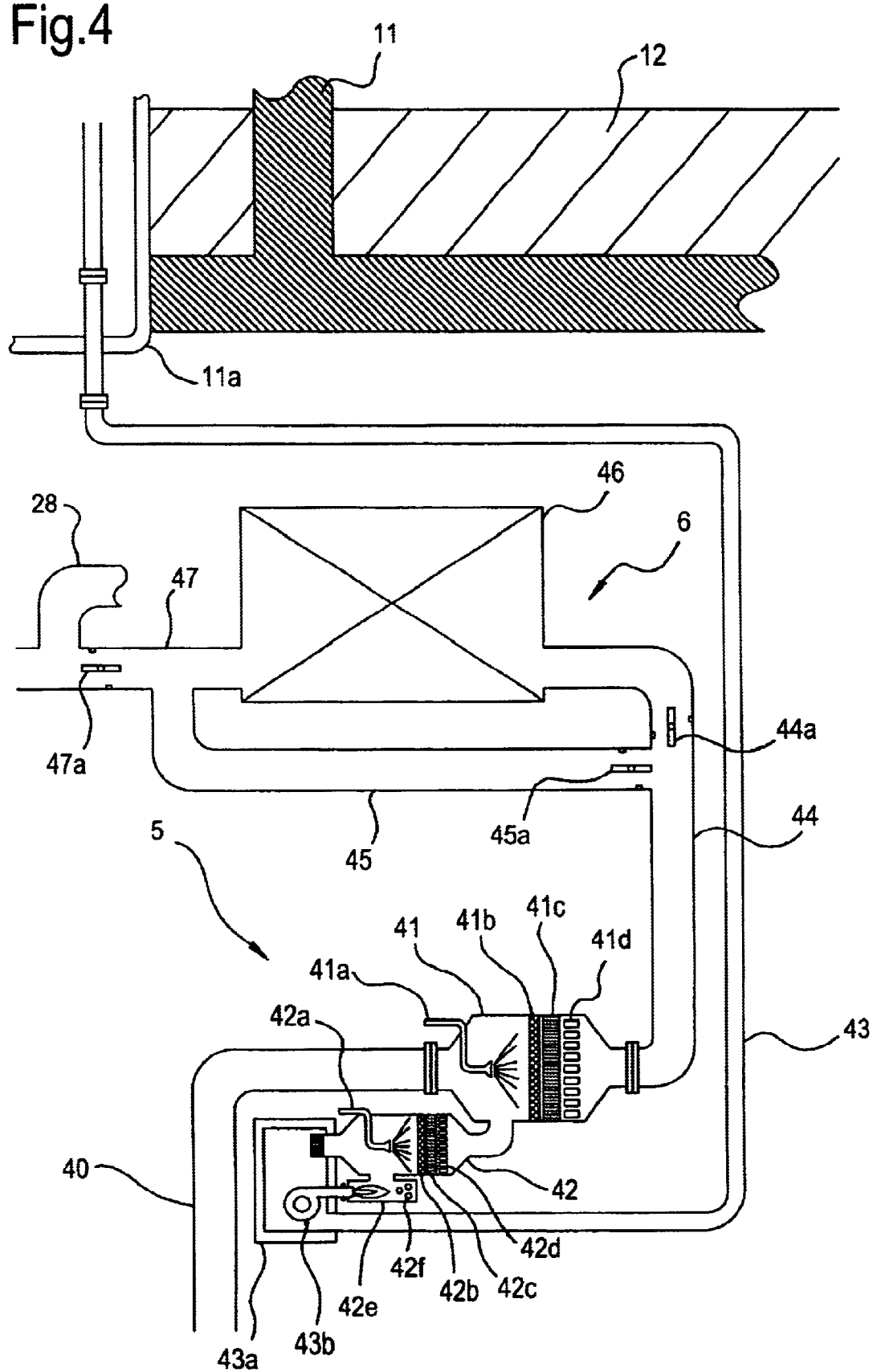
FIG. 4 is an enlarged view showing the smoke combustion portion and the dust filter apparatus of the multifunctional disposal apparatus.

FIG. 3 is a partially enlarged view of a multifunctional disposal apparatus according to the present invention. That is, this is an enlarged view showing the kiln furnace 3, the first smoke feeding portion 4, the smoke combustion chamber 5, the dust filter portion 6, and the second smoke feeding portion 7 provided between the A—A line and the B—B line in FIG. 1. FIG. 4 is an enlarged view of the smoke combustion portion and the dust filter portion of the multifunctional disposal apparatus according to the present invention.

Referring to FIG. 3, to the smoke leading tube 29 connected to the dry combustion chamber 2 shown in FIG. 2 are continuously provided the kiln furnace 3, the first smoke feeding portion 4, the smoke combustion portion 5, the duct filter portion 6 and the second smoke and the second smoke feeding portion 7 in the mentioned order.

The kiln furnace 3 is rotatably provided to a tip 31a of the smoke leading tube 29 and one end 31b of the cyclone furnace 35. A plurality of rails 31c are provided on the outer peripheral surface of a cylindrical body 31 of the kiln furnace 3. There are drive wheels 31d which rotate in contact with the rails 31c of the cylindrical body 31. A storage chamber 33 is provided to the kiln furnace 3 via the tube 33a, and an opening/closing valve 34 is provided between the cyclone furnace 35 and the kiln furnace 3. Reference numeral 32 denotes a refuse input portion for inputting the refuse into the cylindrical body 31 of the kiln furnace 3. The refuse input portion 32 and the storage chamber 33 for burned embers may be provided on the opposed positions on the left and right end surfaces.

The refuse input portion 32 provided to the kiln furnace 3 has an input opening 32a opened in the funnel-like shape, and a first opening/closing valve 32b and a second opening/closing valve 32c are provided in the refuse input portion 32 as shown in FIG. 3. The first opening/closing valve 32b is used for dropping an appropriate amount of the raw refuse, the sludge, the general garbage and other inputted from the input opening 32a into the second opening/closing valve 32c, and the second opening/closing valve 32c is used for inputting the raw refuse, the sludge, the general garbage and others into the kiln furnace 3.

The cylindrical body 31 of the kiln furnace 3 is hollow, and the hot air and the smoke which flows into the rotating cylindrical body 31 and is sent from the smoke leading tube 29 dry and incinerate the object to be burned such as the refuse in the kiln furnace 3. The exhaust gas, the hot air, the smoke and the flue gas generated from incineration are absorbed into the first smoke feeding portion 4.

The burned embers obtained by drying and incinerating the object of combustion while being rotated in the cylindrical body 31 enter the storage chamber 33 through the tube 33a. The burned embers can be reused as a fertilizer and others because they are completely burned at an extremely high temperature.

Opening/closing of all the valves 29a, 32b, 32c and 34 provided to the kiln furnace 3 and rotation of the cylindrical body 31 by the drive wheels 31d may be automatically controlled by a computer and the like. Sensors for detecting a combustion temperature, an exhaust temperature, a water content and others may be provided to the inside of the cylindrical body 31, the smoke leading tube 29 and others in order to enable automatic control using a computer.

The first smoke feeding portion 4 is made up of a cyclone furnace 35, an air leading tube 36, a burner 37, an air supplying tube 38, a blower 39, an air supplying tube 39a and a flue 40. Since a tip of the air supplying tube 39a attached to the blower 39 is slightly inserted into a tube end 40a of the flue 40, the air supplied from a tube end 39b of the air supplying tube 39a connected to the blower 39 is blown from the lower end 40a of the flue 40 and it is further emitted to the flue 40 while taking the smoke, the hot air and others from the inside of the cyclone furnace 35 by the ejector effect. Therefore, the inside of the cyclone furnace 35 constantly forms a vacuum.

The hot air, the smoke and other s from the kiln furnace 3 are blown to a position slightly shifted from the center of the upper portion of the cyclone furnace 35 and cause the funnel fume contained in the hot air, the smoke and others to be gradually dropped into the lower portion of the cyclone furnace 35 while spirally rotating in the cyclone furnace 35. At this time, the burner 37 attached to accelerate spiral rotation of the hot air, smoke and others reheats the funnel fume contained in the hot air, the smoke and others so that the funnel fume is completely burned to be nontoxic.

A vortex flow in the cyclone chamber 35 extremely extends the flame of the burner 37, and the hot air, the some and others are in contact with the flame for a long time (a holding time of not less than 2 sec is requested with respect to a newly constituted furnace in the secondary guideline of Waste Management Law issued in January, 1997). Therefore, the inside of the cyclone furnace 35 can maintain a high temperature or a ceramic heat retaining material may be provided inside to maintain a high temperature by the thermal storage effect. (In the above-mentioned guideline, an incineration temperature of not less than 850° C., or preferably not less than 900° C. is requested. 1100° C. or a higher temperature is designated for incineration of PCBs.)

Further, since the air supplying tube 38 for leading the fresh air into the blower 39 is connected to the air leading tube 60 which passes the cooling tank portion 9, the air led into the blower 39 becomes an extremely cold air capable of cooling down the high temperature hot air in the cyclone furnace 35 at a blast (it is said that the rapid cool down of the combustion gas to not above 200° C. (there is a research result mentioning that the cool down to not above 200° C. in approximately 1 sec is necessary) is required in order not to recombine dioxins at approximately 300° C.).

Therefore, toxic substances such as dioxin, NOx, SOx, HCI and others contained in the hot air, the smoke and others can be pyrolyzed in the cyclone furnace 35 to remove the smoke, dust and others.

The air leading tube 36 and the air supplying tube 38 connected to the burner 37 and the blower 39 have one ends connected to the air intake box 11a to take in the fresh air. In addition, the gas flue 40 attached to the cyclone furnace 35 of the first smoke feeding portion 4 is connected to the smoke combustion portion 5.

Drive of the burner 37 and the blower 39 provided to the first smoke feeding portion 4 may be automatically controlled by a computer. In addition, sensors for detecting a combustion temperature, an exhaust temperature, a water content and others may be provided in the cyclone furnace 35 in order to allow automatic control by a computer. In the multifunctional disposal apparatus according to the present invention, the kiln furnace 3 may not be provided. The kiln furnace 3 may be provided in front of the dry combustion furnace 2. In the multifunctional disposal apparatus according to the present invention, the dry combustion furnace 3 itself may not be provided.

Description will now be given on the smoke combustion portion 5 and the dust filter portion 6 shown in FIG. 4. As shown in FIG. 4, the smoke combustion portion 5 again burns at a high temperature the hot air, the smoke and the gas which are emitted from the first smoke feeding portion 4 and substantially defused so that they are completely burned.

The smoke combustion portion 5 is made up of a gas flue 40, a catalytic burner 41, an auxiliary catalytic burner 42, an air leading tube 43, an air intake box 43a, and a heating burner 43b. The catalytic burner 41 is a cylindrical body provided between the gas flues 40 and 44. In order to accept from the auxiliary catalytic burner 42 the preliminary heat required for producing a high temperature at which the dioxins and the toxic gas are burned, the auxiliary catalytic burner 42 is provided to the catalytic burner 41.

In order to burn the fed gas at an extremely high temperature, the catalytic burner 41 and the auxiliary catalytic burner 42 include nozzles 41a and 42a for spraying coal oil, crude oil or gas and the like; mixers 41b and 42b for burning the mixed gas; thermal catalysts 41c and 42c; and ceramics 41d and 42d. The nozzles 41a and 42a for spraying coal oil, crude oil or gas and the like may be stoves or heaters. Besides coal oil, crude oil or gas and the like, liquid hydrogen may be sprayed. The following is the same as above.

The fresh air is taken from the air leading tube 43 connected to the air intake box 11a into the heating burner 43b and the auxiliary catalytic burner 42. In the heating chamber 42e retaining the heat generated by combustion of the heating burner 43b, the fresh air taken into the auxiliary catalytic burner 42 is heated, and coal oil, crude oil or gas and the like is sprayed to the heated fresh air from the nozzle 42a to form a mixed gas of the heated fresh air and the sprayed gas.

A plurality of thermal storage mediums 42f consisting of ceramics, heat resistant metals and others are provided inside the heating chamber 42e, heating the thermal storage mediums 42f by the heating burner 43b causes the heat of the heating burner 43b to be stored. When heating is carried out beyond the capacity of the thermal storage mediums 42f, an infrared ray or heat is emitted to maintain the heating chamber 42e at a high temperature.

A temperature of the mixed gas of the heated fresh air and the spray gas increases to a flash point to start combustion, and the mixed gas passes the mixer 42b to further mixed up. The mixed gas in the combustion state is subjected catalytic combustion by passing through the thermal catalyst 42c. After passing the thermal catalyst 42c, the mixed gas becomes a thermal catalytic high-temperature gas having a temperature of approximately 800° C. to 1300° C. The thermal catalytic high-temperature gas passes through the ceramic 42d having a honeycomb structure to be supplied to the catalytic burner 41.

In the catalytic burner 41, the gas passing the flue 40 via the first smoke feeding portion 4 is mixed with the thermal catalytic high-temperature gas, and coal oil, crude oil, gas or liquid hydrogen is sprayed or burned to form the mixed gas.

The temperature of the mixed gas increased to a flash point (approximately 200° C. to 250° C.) to start the combustion, and the gas is well mixed up while passing through the mixer 41b. The mixed gas in the combustion state is subjected to catalytic combustion at approximately 400° C. by passing the thermal catalytic 41c. The mixed gas then passes through the thermal catalyst to become the thermal catalytic high-temperature gas having a temperature of approximately 800° C. to 1300° C. The thermal catalytic high-temperature gas passes through the ceramic 41d having a honeycomb structure to be fed to the gas flue 44.

The gas passing through the catalytic burner 41 is subjected to complete combustion as the thermal catalytic high-temperature gas, and the exhaust gas emitted to the gas flue becomes a complete combustion gas containing a minute amount of dust. The toxic substances such as dioxins, toxic gases, NOx, SOx, HCI and others are completely decomposed and removed from the complete combustion gas.

The dust contained in the exhaust gas is filtered by the dust filter portion 6 provided between the gas flues 44 and 47. The dust filter portion 6 is divided into the gas flue allowing passing through the dust filter apparatus 46 and the gas flue 45 which does not allow passing through the dust filter apparatus 46. The filter apparatus is provided in order to allow passing through the gas flue 45 by controlling the opening/closing valves 44a and 45a when the complete combustion gas obtained after passing through the smoke combustion portion 5 contains no dust or when the dust filter 46 is not provided or not operated. This dust filter device 46 may not be provided to the multifunctional disposal apparatus 1.

Since it is generally known that combining dioxins during cooling down the exhaust gas tends to advance using the funnel fume in the exhaust gas as the catalyst, the combustion smoke is held at a high temperature by the catalytic burner 41 of the smoke combustion portion 5 to completely oxidize and decompose the dioxins. Thereafter, the funnel fume in the exhaust gas is removed before rapid cool down in the cyclone furnace 48 of the second smoke feeding portion 7. This is the very effective means.

The dust filter device 46 is constituted by a filter, a bug filter, an electric dust collector, a wet dust collecting device, a spray tower and others. The dust filter device 46 has a structure made up of a combination of some or all of the filter, the bug filter, the electric dust collector, the wet dust collecting device, the spray tower and others. A combination of these members for constituting the dust filter device 46 can be changed to be used with taking components and the like of an object to be incinerated such as the refused to be disposed into consideration.

The filter is obtained by making each of burnt lime, calcium hydroxide and activated carbon in the form of powder, particles or sponge, molding them into one plate to be superimposed in the form of layers. This filter transmits the exhaust gas through the plate-layered burnt lime, calcium hydroxide and activated carbon to remove the funnel fume and the toxic gas.

The bug filter has a capability for collecting fine particles by a collecting device for collecting the fine powder using a filter fabric bag and the like and is generally often used in an electric vacuum cleaner and the like. Since the temperature of the exhaust gas is extremely high, a material for the filter fabric bag must be carefully selected. In particular, when the temperature is too high for the filter fabric, water must be sprayed, injected or dropped from a nozzle to lower the temperature of the exhaust gas.

The electric vacuum cleaner is a device for collecting the fine particles on an electrode plate by the static charge force and often provided to an exhaust flue of a plant and the like. This is a machine that generates the corona discharge therein and impresses the funnel fume to the negative to be collected to the positive pole.

The wet dust collecting device rapidly lowers the temperature while removing impurities by spraying or injecting water to the exhaust gas containing the dust and it is a so-called scrubber. It is used for scrubbing the components which are soluble in water a small amount of which exists in the exhaust gas. There can be utilized a cyclone scrubber for collecting the funnel fume by causing the dust containing exhaust gas which spirally moves up in the cylinder to collide with the liquid drops sprayed from the center of the cylinder in the radial direction or a fluidized bed scrubber which collects the funnel fume by dropping the liquid from the upper nozzle while causing the hollow synthetic resin like a table tennis ball as a filler to be floated by the exhaust gas flow.

The spray tower is an application of the scrubber which removes the funnel fume by dispersing liquid drops, liquid films or bubbles of a cleaning fluid from multiple nozzles in the counter direction of the dust containing exhaust gas flow and it is a so-called cooling tower. As the time in which the liquid drops are in contact with the exhaust gas is long, the ratio for removing the toxic gas or funnel fume becomes higher, and this tower is often used in a small incinerator.

An opening/closing valve 47a is provided to a gas flue 47 connected to the dust filter device 46, and an exhaust tube 28 of the melting device 10 is connected at a rear position of the opening/closing valve 47a. When the melting device 10 is operated, the hot air used for melting the expanded polystyrene and the polymer-based substance at a high temperature is supplied to the gas flue 47.

When again burning only the gas which has passed the dust filter portion 6 in the second smoke feeding portion 7, the opening/closing valve 28a of the exhaust tube 28 is closed and the opening/closing valve 47a of the gas flue 7 is opened. When again burning also the hot air which has passed the melting device 10 in the second smoke feeding portion 7, both the opening/closing valve 28a and the opening/closing valve 47a are opened.

All the valves 44a, 45a and 47a, the heating burner 43b, and the nozzles 41a and 42a provided to the smoke combustion portion 5 and the dust filter portion 6 may be automatically controlled by a computer. Various kinds of sensors for detecting a combustion temperature, an exhaust temperature, a water content and others may be provided to the gas flues 40 and 44, the catalytic burner 41, the auxiliary catalytic burner 42, the dust filter device 46 and others for allowing automatic control by a computer.

As shown in FIG. 3, the gas flue 47 of the dust filter portion 6 is connected to the cyclone furnace 48 of the second smoke feeding portion 7. The second smoke feeding portion 7 is made up of the cyclone furnace 48, the air leading tube 49 for taking in the air, the burner 50, the air tube 51, the blower 52, the air supplying tube 52a and the flue 53. Since the tip of the air supplying tube 52a attached to the blower 52 is slightly inserted into the lower end 53a of the flue 53, the air supplied from the tip 52b of the air supplying tube 52a connected to the blower 52 is blown to the lower end 53a of the flue 53, and the air is emitted to the flue 53 while taking in the smoke, the hot air and others in the cyclone furnace 48 by the ejector effect. Therefore, the inside of the cyclone furnace 48 constantly forms a vacuum. There may be employed a method for inserting a pipe directly into the flue and supplying the air by the blower to maintain the air in the furnace to be vacuum. Alternatively, an induction fan may be used.

Further, as shown in FIG. 3, the gas such as the hot air, the smoke and others supplied from the dust filter portion 6 or the melting device 10 is blown to a position slightly shifted from the center of the upper part of the cyclone furnace 48 and gradually moves down the funnel fume contained in the hot air or the smoke to be blown down while rotating in the cyclone furnace 48. Here, the burner 50 attached for accelerating the rotational direction of the hot air or the smoke is used to again burn the gas so that the gas can be subjected to complete combustion to be nontoxic.

A vortex flow in the cyclone furnace 48 ensures the flame of the burner 50 to extremely extend, and the hot air or the smoke can come into contact with the flame for a long period of time, thereby maintaining the inside of the cyclone furnace 48 at a high temperature. Further, since the air tube 51 for leading the fresh air into the blower 52 is connected to the air leading tube 60 passing the cooling tank portion 9, the air led into the blower 52 becomes a very cold air, and the hot air maintained at a high temperature in the cyclone furnace 48 can be cooled down at a blast.

Therefore, the toxic substances such as dioxins, NOx, SOx, HCI and others contained in the hot air or the smoke can be completely pyrolyzed in the cyclone furnace 48, and the smoke, the dust and others can be completely removed at last.

The air leading tube 49 and the air tube 51 connected to the burner 50 and the blower 52 have one ends communicating with the air intake box 11a so that the fresh air can be taken in. Moreover, the flue 40 pierces from the cyclone furnace 48 to the outside of the multifunctional disposal apparatus 1 and discharges the nontoxic defused gas to the outside of the apparatus 1.

Driving of the burner 50 and the blower 52 provided to the second smoke feeding portion 7 may be automatically controlled by a computer. Sensors for detecting a combustion temperature, an exhaust temperature, a water content, a vacuum state, a smoke and others may be provided in the cyclone furnace 48 to allow automatic control by a computer.

FIG. 5 is a partially enlarged view of a multifunctional disposal apparatus according to the present invention, showing the air heating portion and the cooling tank portion provided on the left side of the multifunctional disposal apparatus taken along the B—B line in FIG. 1 in the enlarged manner.

The air heating portion 8 includes the air leading tube 54, the heating burner 55, the air tube 56, the heating chamber 57 and the air supplying tube 58. The fresh air led from the air leading tube 54 whose one end is inserted into the air intake box 11a is used for combustion of the heating burner 55 connected to the other end of the air leading tube 54.

The heating burner 55 is installed in the heating chamber 57 and heats the fresh air taken in from the air tube 56 connected to the air intake box 11a. The hot air is then absorbed to the air supplying tube 58 because of the vacuum state.

A plurality of thermal storage mediums 57a of ceramics, heat resistant metals, or others are provided in the heating chamber 57. When the heat storage mediums 57a are heated by the heating burner 55, the heat of the heating burner 55 is stored. Also, when heating is carried out beyond the capacity of the thermal storage mediums 57a, an infrared ray or heat is emitted, thereby maintaining the heating chamber 57 at a high temperature.

The air supplying tube 58 is connected to an air cooling tube 61 of the cooling tank portion 9, the air supplying tube 22 of the dry combustion furnace 2, and the air supplying tube 25 of the melting device 10. The hot air supplied from the heating chamber 57 to the air supplying tube 58 is absorbed into the air supplying tube 22 of the dry combustion furnace 2 or the air supplying tube 25 of the melting device 10.

When supplying the hot air to the air supplying tube 22 of the dry combustion furnace 2, the cold air or the gas which is a mixture of the hot air and the cold air having a medium temperature may be supplied as well as the hot air.

Therefore, the temperature of the gas supplied to the air supplying tube 22 can be adjusted by controlling a valve travel of the opening/closing valve 61b of the air cooling tube 61.

Of course, adjustment of a heating quantity of the heating burner 55 of the air heating portion 8 or valve travels of the opening/closing valve 58a of the air supplying tube 58, the opening/closing valve 22a of the air supplying tube 22, the opening/closing valve 61b of the air cooling tube 61 may be automatically controlled by a computer. Sensors for detecting a combustion temperature, a temperature, a water content, a vacuum state, a smoke and others may be provided in the heating chamber 57, the air supplying tube 22 and others to allow automatic control by a computer.

The cooling tank portion 9 is made up of a water tank 59, an air leading tube 60, an air cooling tube 61, an endothermic tube 62, a circulation tube 30, a freezing machine 63, and a circulation tube 64. An input opening 59a from which water, rain water, snow, ice and others can be inputted into the water tank 59 is provided on the top of the water tank 59, and an opening/closing valve 59a is also provided to adjust an amount of water or ice which can be inputted into the water tank 59.

The air leading tube 60 and the air cooling tube 61 communicate with the water tank 59. The air leading tube 60 lead the fresh air into the blower 39 which demonstrates the ejector effect of the first smoke feeding portion 4 and the second smoke feeding portion 7, and to a part of the air leading tube 60 communicating with the water tank 59 is provided a cooing portion 60a disposed in the corrugated form so that the fresh air to be led to the blowers 39 and 52 can be cooled down.

The air cooling tube 61 is used for leading the fresh air to the dry combustion furnace 2. This tube 61 is provided in order to lower the temperature of the hot air heated by the air heating portion 8 to be led into the dry combustion furnace 2 or absorb the dry cold air into the dry combustion furnace 2. To the air cooling tube 61 are provided the cooling portion 61a which is disposed in the corrugated form at a portion communicating with the water tank and the opening/closing valve 61b so that the fresh cold air led into the dry combustion furnace 2 can be supplied while adjusting an amount thereof. Since the cold air can be absorbed by forming a vacuum in the furnace, uniform supply of the air in the furnace can be utilized.

In order to cool down the water or the liquid reserved in the water tank 59, the endothermic tube 62 provided to the cooling machine 63 is disposed in the water tank 59. A coolant having a low coagulation point which is cooled down in the freezing machine 63 is circulated in the endothermic tube 62, and this coolant takes heat from the water or the liquid in the water tank through the endothermic tube 62 to cool down the water or the liquid.

The circulation tube 30 connected to the combustion chamber 17 of the dry combustion furnace 2 is connected to the freezing machine 63 to transmit the combustion heat obtained from the combustion chamber 17 to the freezing machine 63 by using the hot water, steam and others in the circulation tube 30. The combustion heat is used in the freezing machine 63 to cool down the coolant.

The circulation tube 30 led to the freezing machine 63 is connected to the freezing machine or a turbine generator to generate the electricity by utilizing the hot water or the steam circulating in the circulation tube 30. Further, this tube 30 may be used for driving the burner, the blower, the kiln furnace, the dry plates, the grating plate, the freezing machine used in the multifunctional disposal apparatus 1, opening/closing the valve, or as a power supply of a belt conveyer for inputting the refuse or an air cooler provided in facilities. In addition, the night power and the incineration heat are used, and the freezing machine is also used. The ice storage is used for an air cooler in facilities.

Of course, the generator is not restricted to the turbine generator, and it may be used together with an aerogenerator, a photovoltaic generator, a liquid hydrogen generator, a fossil fuel of a solar battery, an accumulator battery and others instead of the turbine generator. Moreover, a generation method using no atomic energy may be adopted.

A circulation tube 64 for circulating the cooling water for an air cooler in a facility or a room by using the thermal heat of the water tank 59 is inserted into the water tank 59 of the cooling tank portion 9.

A degree of opening/closing of the opening/closing valve 59b of the water tank 59 and the opening/closing valve 61b of the cooling tube 61 of the cooling tank portion 9 and driving of the freezing machine 63 may be automatically controlled by a computer. Sensors for detecting a temperature, a moisture content, a water level, a vacuum state, and others may be provided in the water tank 59, the air cooling tube 61 and others to enable automatic control by a computer.

Figure 6:
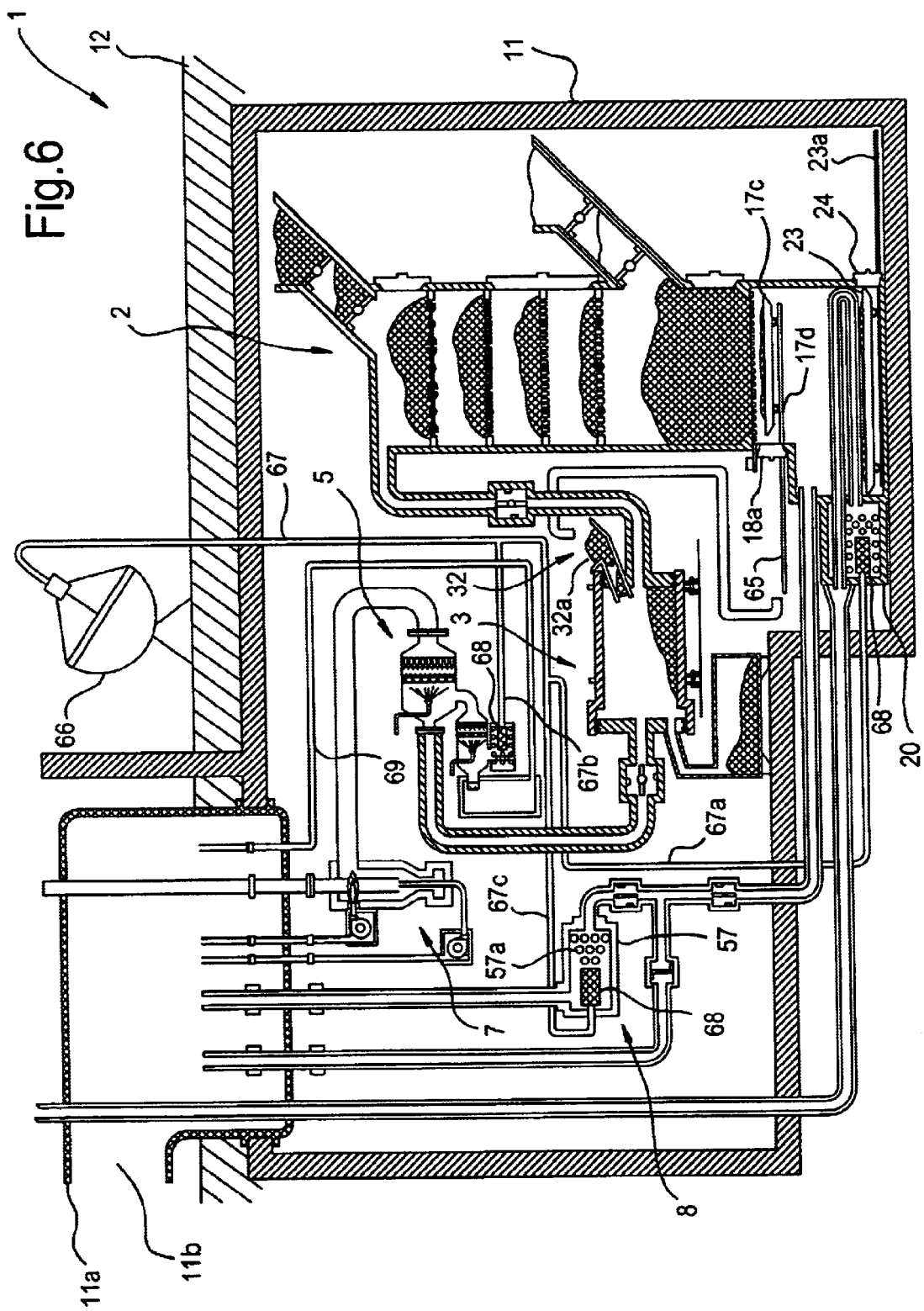
FIG. 6 is a cross-sectional view showing an overall multifunctional disposal apparatus according to another embodiment.

FIG. 6 is an overall cross-sectional view showing an embodiment of a multifunctional disposal apparatus according to the present invention. In this embodiment, heat radiators 68 connected to a heat pipe 67 are substituted for the heating burners 20a, 43b and 55 provided to the dry combustion furnace 2, the smoke combustion portion 5 and the air heating portion 8 of the multifunctional disposal apparatus 1 illustrated in FIG. 1.

The heat pipe 67 transmits the heat of the solar energy collected by a parabola condenser 66 set outside the multifunctional disposal apparatus 1a to the heat radiators 68 provided to the heating chambers 20, 42e and 57 of the dry combustion furnace 2, the smoke combustion portion 5 and the air heating portion 8.

One end of the heat pipe 67 is connected to the parabola condenser 66, and branching heat pipes 67a, 67b and 67c are provided. Further, the other ends of the heat pipes 67a, 67b and 67c are connected to the heat radiators 68 to transmit the heat of the condenser 66. As to a material of the heat pipes 67a, 67b and 67c, pipes using a heat transfer metal as its material or pipes using ceramics as its material may be used.

The structure for transmitting the heat of the solar energy to the respective heat radiators 68 may be adopted by using the parabola condenser 66 as a lens condenser. Alternatively, a method for converting the energy into the electricity to transmit the heat of the heater may be used.

In the multifunctional disposal apparatus 1a illustrated in FIG. 6, although the first smoke feeding portion 4 and the dust filter portion 6 provided to the multifunctional disposal apparatus 1 illustrated in FIG. 1 are not shown, the first smoke feeding portion 4 and the dust filter portion 6 may or may not be provided.

In the dry combustion furnace 2 of the multifunctional disposal apparatus 1a, although the ash access door 18a is provided in order to take out the incinerated ash accumulated on the ash pan 17c to the outside of the dry combustion furnace 2, rails d may be provided inside or outside the ash access door 18a and wheels and the like may be attached to the ash pan 17c for enabling sliding in order to facilitate access to the ash pan 17c. In addition, a screw conveyer or a belt conveyer may be attached instead of the rails 17d.

In the dry combustion furnace 2 of the multifunctional processing apparatus 1a, the funnel fume access door 24 is provided in order to take out the funnel fume accumulated on the funnel fume pan 23 to outside of the dry combustion furnace 2, but rails 23a are provided inside or outside the funnel fume access door 24 and wheels and the like are also attached to the funnel fume pan 23 for enabling sliding in order to facilitate access to the funnel fume pan 23. Further, a screw conveyer or a belt conveyer may be attached instead of the rails 23a. A vibrating belt conveyer may be also used.

In addition, there is provided a screw conveyer 65 in order that the ash access door 18a is opened to take out the ash pan 17c and the incinerated ash accumulated on the ash pan 17c is moved to the kiln furnace 3. A belt conveyer or a vibrating belt conveyer and the like may be employed as the screw conveyer 65.

Of course, driving of the opening/closing valve, the burner, the blower, the conveyer, the parabola condenser and the like provided to the multifunctional disposal apparatus 1a shown in FIG. 6 may be automatically controlled by a computer. Sensors for detecting a temperature, a humidity, a water level, a vacuum state and others may be provided for enabling automatic control by a computer.

Figure 7:
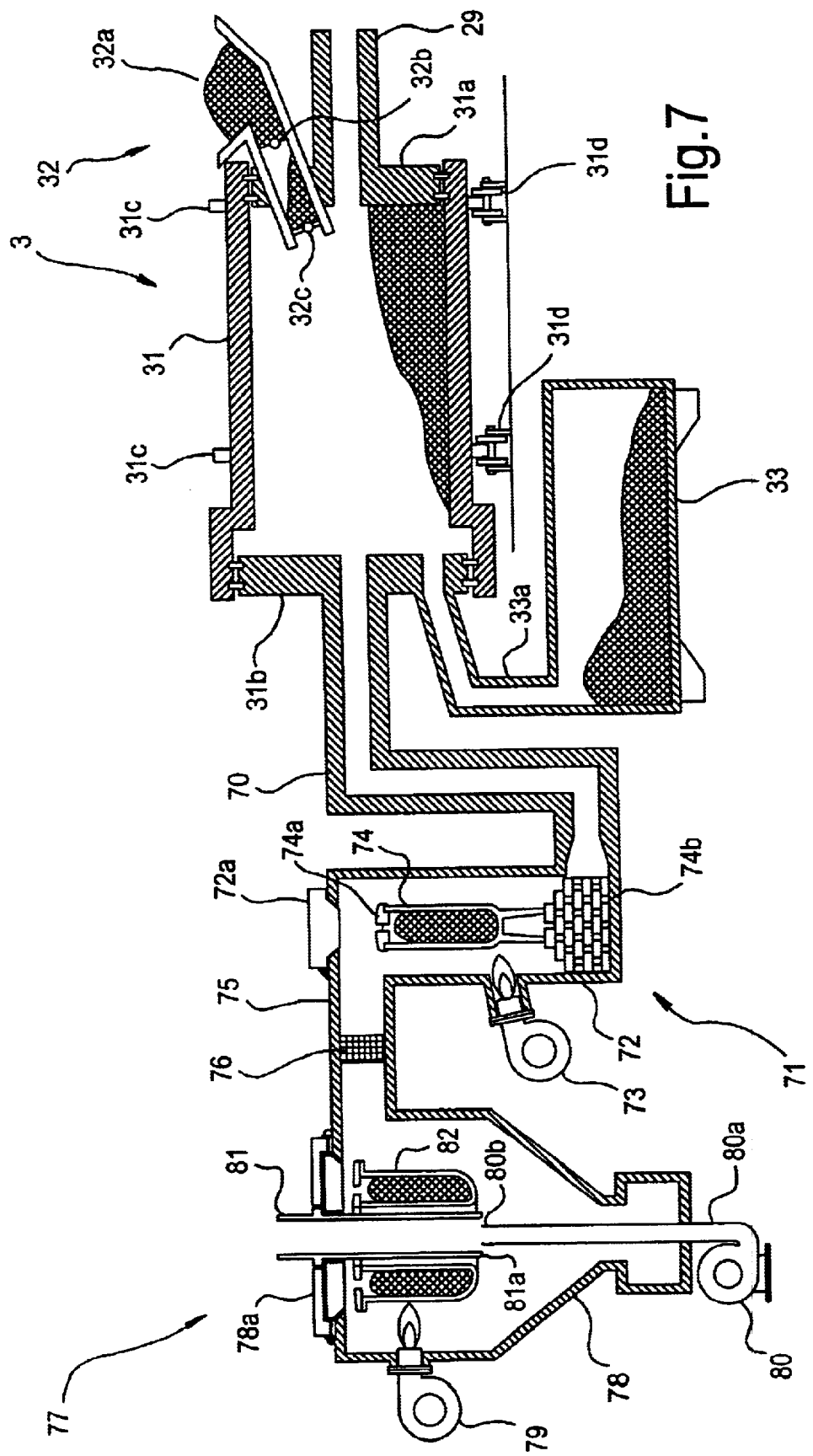
FIG. 7 is an enlarged view showing a kiln furnace, an ash melting portion and a smoke feeding portion of the multifunctional disposal apparatus according to another embodiment of the present invention.

FIG. 7 is a partially enlarged view of another embodiment of the multifunctional disposal apparatus according to the present invention. In this embodiment, the first smoke feeding portion 4 provided at the rear of the kiln furnace 3 of the multifunctional disposal apparatus 1 and 1a is provided as an ash melting portion 71 and a smoke feeding portion 77. The structure in which the ash melting portion 71 and the smoke feeding portion 77 are provided at the rear of the dry combustion furnace 2 may be also adopted.

A gas flue 70 extending from the center of one end 31b of the kiln furnace 3 is provided to the kiln furnace 3, and the ash melting portion 71, the gas flue 75 and the smoke feeding portion 77 are continuously provided to the other end of the gas flue 70.

The ash melting portion 71 is constituted by a melting furnace 72 having a cover 72a, a heating burner 73, a crucible 74 having a cover 74a, and a fire brick 74b. The cover 72a is attached to the top face of the melting furnace 72 having a castable refractory and the like on the inner wall surface thereof so that the cover can be opened/closed, and the heating burner 73 diagonally facing upwards is provided on the side surface of the same.

The fire bricks 74b are heaped up on the inner bottom of the melting furnace 72 or the castable refractory is used to build a base, and the crucible 74 is mounted and formed thereon. The crucible 74 has a cylindrical shape, and a plurality of leg portions are extended downwards from the bottom face while the top face is opened. The cover 74a having a hole is put on the top face, and the incinerated ash obtained from the dry combustion furnace 2 or the kiln furnace 3 is filled in the crucible 74.

The hot air containing the smoke supplied from the kiln furnace 3 or the dry combustion furnace 2 is used to completely burn a small amount of remaining unburned gas, funnel fumes, toxic gases such as COx, SOx, NOx and others, dioxins at a high temperature of approximately 1300° C. 1800° C. by the relatively large heating burner 73 provided to the ash melting furnace 71. The crucible 74 can be heated by the high heat obtained by heating of the heating burner 73 and the incinerated ash accommodated in the crucible 74 can be molten.

The flame surrounding the crucible 74 has a spiral form around the crucible 74 due to the hot air from the kiln furnace 3 or the dry combustion furnace 2, the power of the mixed gas combustion and provision of the heating burner 73 at a orthogonal lower position, thereby uniformly heating the entire crucible 74.

When the fire bricks 74b are provided around the crucible 74, the inside of the ash melting furnace 72 can be maintained at a high temperature by heat storage and heat retention effect. If a gap is provided around the crucible 74 to fill the fire bricks 74b or the castable refractory and the like therein, the inside of the crucible 74 can be further stabilized at a high temperature.

The incinerated ash obtained by incinerating paper or wood, raw refuses, resin and others which can be included in the regular incinerated ash can be used for complete carbonization by combustion as well as evaporation of components of carbon, oxygen, nitrogen and others at an extremely high temperature. However, a small amount of incombustible materials such as metals, heavy metals, glass and others is generally mixed in any other components of the combustible object to be incinerated.

The heavy metal is contained in the incinerated ash, and it can adversely affect animate and human beings or a natural world when the incinerated ash is landfilled as it is. Therefore, the incinerated ash can be molten in the ash melting furnace 72 and cooled down to be harden for disposal. Thereafter, the cover 72a is opened to take out the cover 74a, and the agglomerate in the crucible 74 is taken out and cooled down to be hardened.

The agglomerate obtained by melting and hardening the ash is a translucent agglomerate like a marble containing the heavy metals and others. The thus obtained molten object of the incinerated ash can be disposed by being mixed in cement as similar to gravels forming an aggregate for a building material or concrete.

A filter 76 is provided in the gas flue 75 connecting the ash melting portion 71 to the smoke feeding portion 77. The dust collecting/filtering effect of the filter 76 is increased by utilizing a thermal catalytic filter, a ceramic filter and others. Clogging of the filter can be suppressed since complete incineration is carried out by using the combustion heat in the front stage. The clogs can be burned when a burner and the like is attached. Any kind of the filter 76 can be used if it permeates the air, the vapor and others therethrough. Pores of 50 angstrom to 500 angstrom are produced to the filter, and the inside of the dry combustion chamber 2 and that of the kiln furnace 3 form a vacuum when molecules of the air pass the pores. When the filter 76 is used as a ceramic filter and pores of 50 angstrom to 500 angstrom are formed, molecules of the smoke and the like do not pass through the pores. It is to be noted that since a number of molecules of the air is several angstrom to 50 angstrom, the ceramic filter may not be used.

The smoke feeding portion 77 is constituted by a cyclone furnace 78 having a cover 78a, a burner 79, a blower 80, an air supplying tube 80a and a gas flue 81.

Since a tip of the air supplying tube 80a attached to the blower 80 is slightly inserted into a tube end 81a of the gas flue 81, the air supplied from a tip 80b of the air supplying tube 80a connected to the blower 80 is blown to the lower end 81a of the gas flue 81. The air is further exhausted to the gas flue 81 while taking in the smoke, the hot air and the like in the cyclone furnace 78 by the ejector effect, and the inside of the cyclone furnace 78 constantly forms a vacuum.

The hot air, the smoke and others blown from the ash melting portion 71 are blown from the upper portion of the cyclone furnace 78 and gradually move down the funnel fume contained in the hot air or the smoke while rotating in the cyclone furnace 78. Here, when the burner 79 attached for accelerating the rotational direction of the hot air or the smoke is used to again burn the hot air, the smoke and others, they are completely burned to be nontoxic.

A vortex flow in the cyclone furnace 78 causes the flame of the burner 79 to extend extremely long, and the hot air or the smoke comes into contact with the flame for a long period of time, thereby maintaining the inside of the cyclone furnace 78 at a high temperature.

A crucible 82 for melting and hardening the ash is provided on the outer peripheral surface of the gas flue 81 formed in the center of the cyclone furnace 78. As shown in FIG. 7, the crucible 82 is constituted by a double cylinder and has a structure in which a bottom is formed between the outer cylinder and the inner cylinder. Further, a cover 82a having a hole is put on the top face. In this manner, results of melting, heat radiation, heat storage can be simultaneously obtained.

The flame of the burner spirally formed keeps the crucible 82 at a high temperature and melts the ash accommodated in the crucible 82. After opening the cover 78a for the crucible 82 and removing the cover 82a, the molten object which is cooled down and hardened after taken out from the crucible is taken out.

The air supplied from the air supplying tube 80a from the blower 80 can cool down the hot air in the cyclone furnace 78 at a high temperature at a blast and supply the air in the cyclone furnace 78 to the gas flue 81. Therefore, toxic substances such as dioxins, NOx, SOx, HCl and others contained in the hot air or the smoke can be pyrolyzed in the cyclone furnace 35 to remove the smoke, the dust and others.

Driving of the burner 79, the blower 80 provided to the smoke feeding portion 77 may be automatically controlled by a computer. Sensors for detecting a combustion temperature, an exhaust temperature, a water content, a vacuum state and others may be provided in the cyclone furnace 78 in order to enable automatic control.

Figure 8:
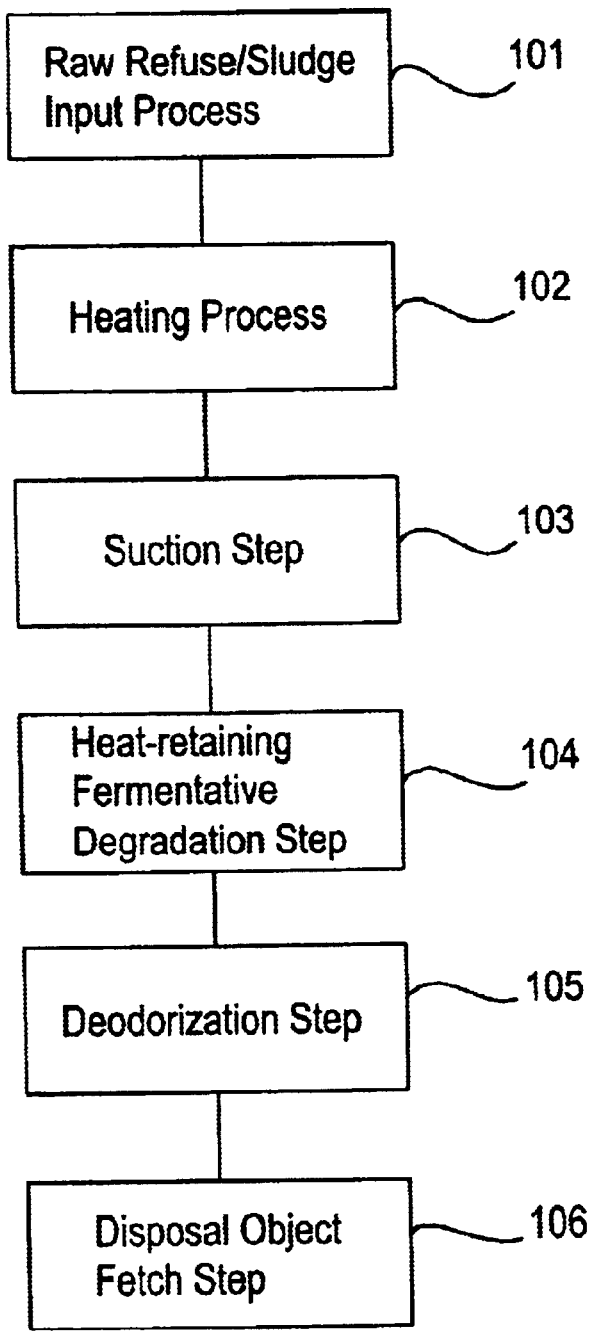
FIGS. 8 and 9 are flowcharts showing a method for pyrolyzing a general garbage or incinerated ashes by using the multifunctional disposal apparatus.
Figure 9:
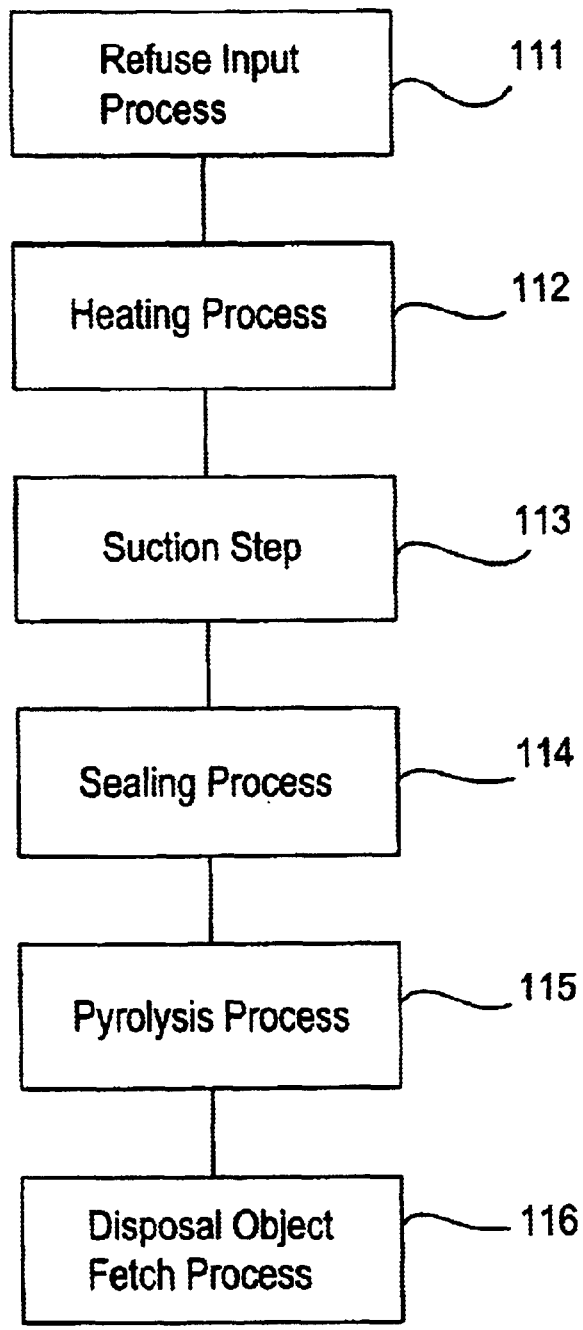
Figure 10:
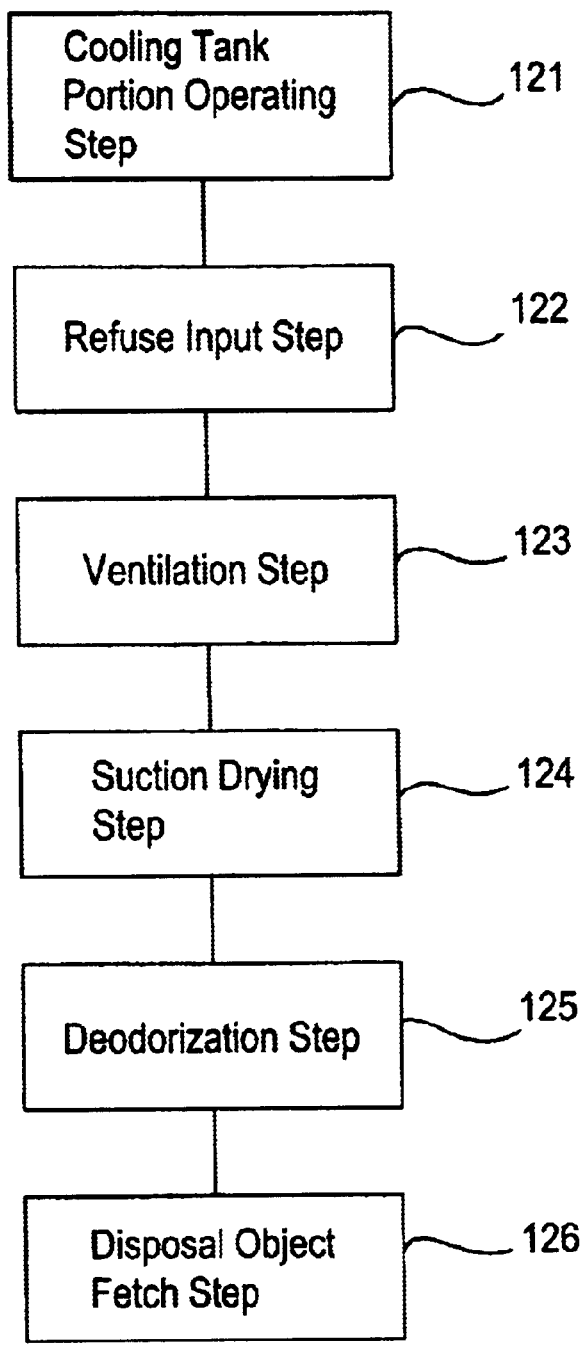
FIG. 10 is a flowchart showing method of application of low-temperature drying process on raw refuse or sludge by using the multifunctional disposal apparatus.
Figure 11:
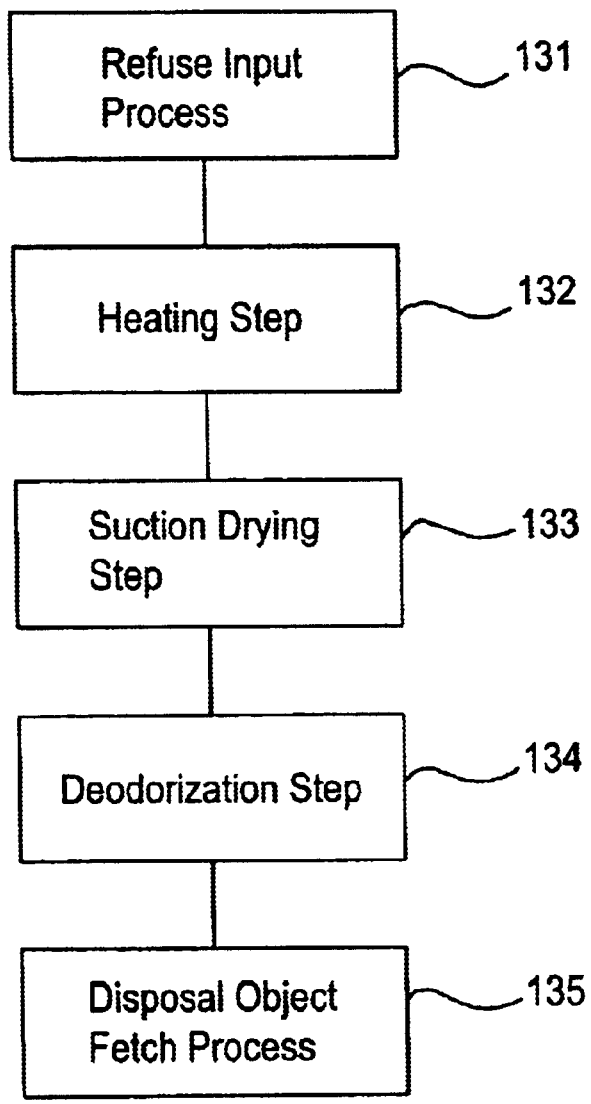
FIG. 11 is a flowchart showing method for using heated hot air to dry general garbage, raw refuse or sludge by using the multifunctional disposal apparatus.
Figure 12:
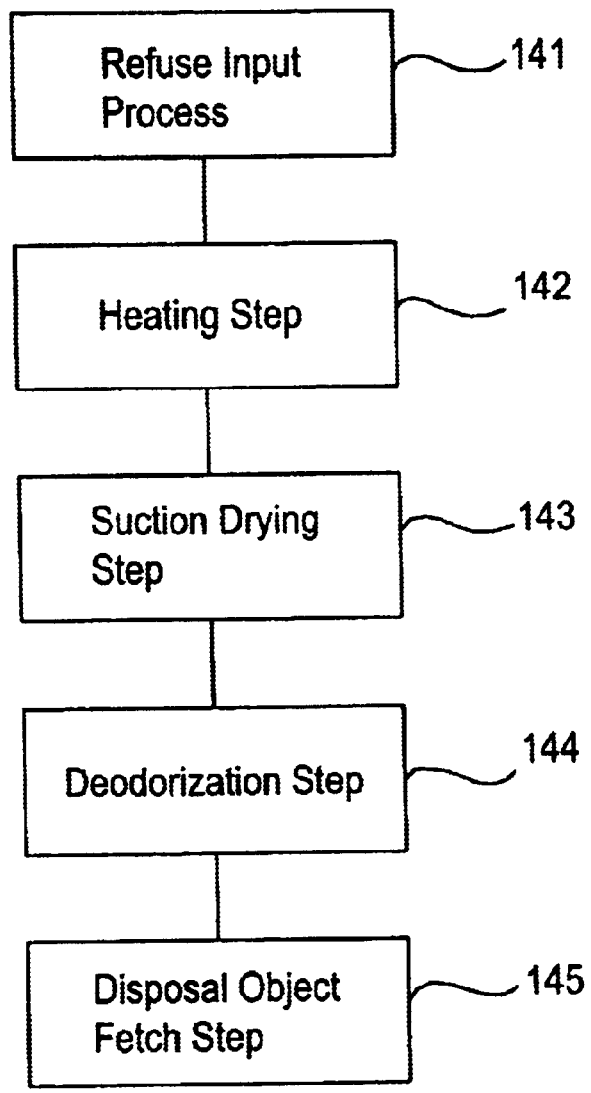
FIG. 12 is a flowchart showing a method for using heated hot air to dry general garbage, raw refuse or sludge by using the multifunctional disposal apparatus.
Figure 13:
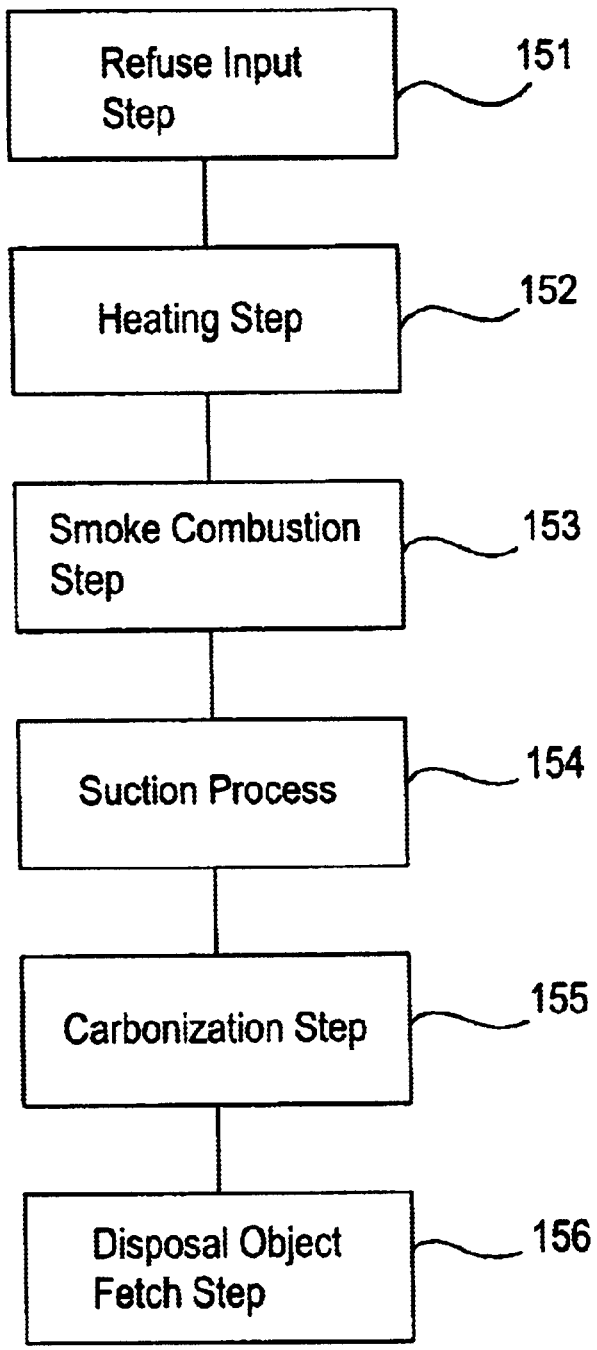
FIG. 13 is a flowchart showing a method for carbonizing general garbage, raw refuse or sludge under a reduced atmosphere by using the multifunctional disposal apparatus.
Figure 14:
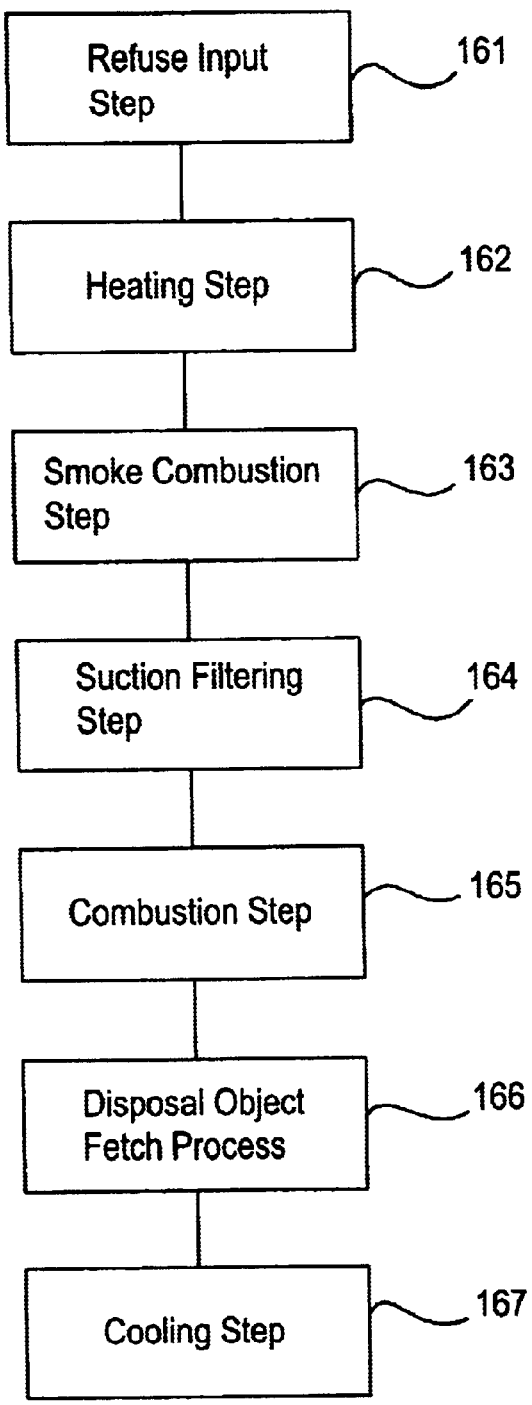
FIG. 14 is a flowchart showing a method for burning general garbage, raw refuse, sludge under reduced atmosphere by using the multifunctional disposal apparatus.
Figure 15:
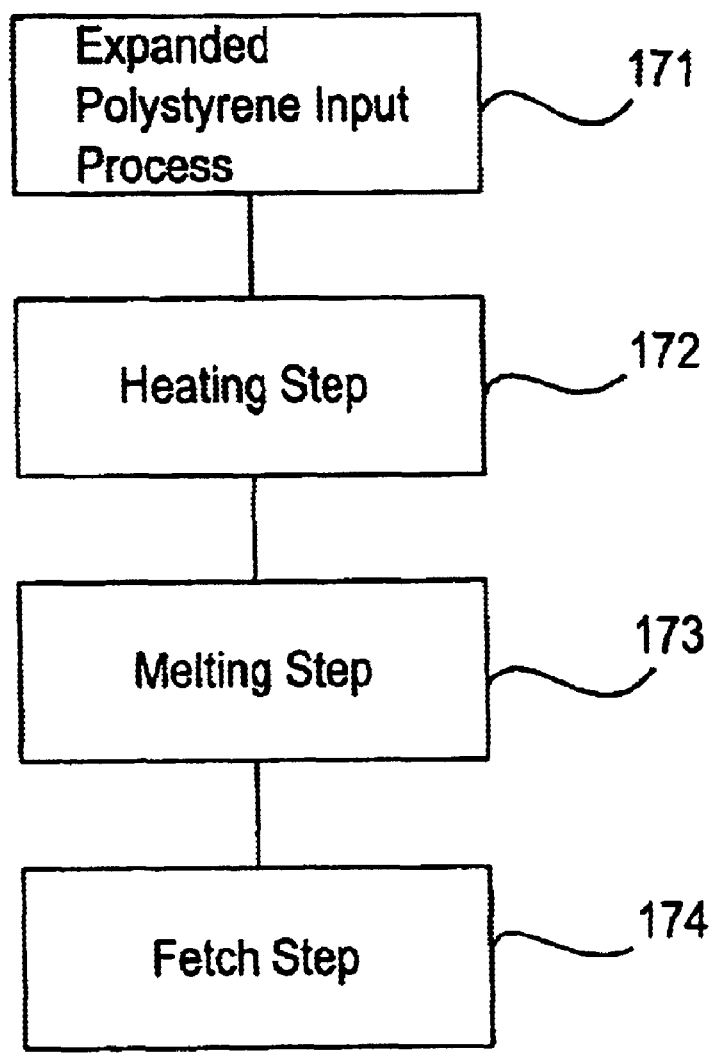
FIGS. 15 and 16 are flowcharts showing a method for melting incinerated ashes by using the multifunctional disposal apparatus.

With reference to FIGS. 8 to 16, a method for disposing an object to be disposed by using the multifunctional disposal apparatuses 1 and 1a according to the present invention will now be described in detail. That is, description will be given as to the method for disposing the raw refuse, the sludge, the general garbage, the expanded polystyrene, the polymer-based substance and others by utilizing the multifunctional disposal apparatus 1 shown in FIGS. 1 to 5, the multifunctional disposal apparatus 1a shown in FIG. 6, the ash melting portion and the smoke feeding portion shown in FIG. 7 and the processing steps thereof. FIG. 8 shows a disposal method by microbial degradation; FIG. 9, a disposal method by pyrolysis; FIG. 10, a disposal method by low-temperature drying; FIG. 11, a disposal method by indirect hot air drying; FIG. 12, a disposal method by direct hot air drying; FIG. 13, a disposal method by carbonization; FIG. 14, a disposal method by incineration; FIG. 15, a disposal method by melting expanded polystyrene and polymer-based substance; and FIG. 16, a method for melting the incinerated ash by using the multifunctional disposal apparatus.

Here, there are two methods of indirect hot air drying.

FIG. 8 is a flowchart showing a disposal method by applying microbial degradation to the raw refuse or the sludge by using the multifunctional disposal apparatus. The disposal method of this example maintains the raw refuse, the sludge and the like at an appropriate temperature to be fermented or decomposed by using microbes or funguses.

"Raw Refuse/Sludge Input Process 101"

The raw refuse or the sludge is inputted into the first dry chamber 15 from the input opening 13*a* of the raw refuse/sludge input portion 13 provided to the dry combustion furnace 2 of the multifunctional disposal apparatus 1 or 1*a* shown in FIG. 2 or FIG. 6. The dry plate 15*a*, and the respective grating plates 15*c*, 15*e* and 15*g* are swiveled so that the raw refuse or the sludge can be evenly accommodated in the respective dry chambers 15, 15*b*, 15*d* and 15*f*.

When the sludge to be inputted is an active sludge which can be obtained by decomposition process by the active sludge method, the microbial degradation further advances. Of course, the raw refuse or the sludge may be inputted from the doors 16 and 16*a* of the dry combustion furnace 2 into the respective dry chambers 15, 15*d* and 15*f*, or the raw refuse or the sludge may be inputted from the input opening of the general garbage input portion 14 or the door 18 into the combustion chamber 17. That is because no combustion incineration disposal is not carried out in the combustion chamber 17 in this disposal method.

The raw refuse or the sludge may be inputted from the input opening 32*a* of the refuse input portion 32 provided in the kiln furnace 3 shown in FIG. 3, FIG. 6 or FIG. 7 into the kiln furnace 3. That is because the dry incineration disposal is not carried out in the kiln furnace 3 in this disposal method.

"Heating Process 102"

The heating burner 20*a* provided to the lower portion of the dry incinerator 2 shown in FIGS. 2 and 3 is ignited, or the heat radiator 68 shown in FIG. 6 is driven. At the same time, the opening/closing valve 58*a* of the air supplying tube 58 of the air heating portion 8 shown in FIG. 3, 5 or 6 is closed, and the opening/closing valve 61*b* of the air cooling tube 61 of the cooling tank portion 9 and the opening/closing valve 22*a* of the air supplying tube 22 of the dry combustion furnace 2 are opened.

The fresh air is taken from the air cooling tube 61 to be led from the air supplying tube 22 to the dry combustion furnace 2. The cooling tank portion 9 may or may not be operated. The fresh air taken in the dry combustion furnace 2 is heated by the heat of the heating burner 20*a* radiated from the heat radiation tube 20*b*. The hot air which passes in the heat radiation tube 20*b* and is obtained by the heating burner 20*a* passes through the exhaust tube 21 to be exhausted to the air intake box 11*a* after heat radiation.

"Suction Step 103"

The blower 39 of the first smoke feeding portion 4 or the blower 52 of the second smoke feeding portion 7 shown in FIG. 3, 5 or 6 is driven, or the blower 80 of the smoke feeding portion 77 shown in FIG. 7 is driven so that the inside of the dry combustion furnace 2 and that of the kiln furnace 3 form a low vacuum state. Any one or some of the respective blowers 39, 52 and 80 may be driven or all of them may be driven. When driving the blowers 39, 52 and 80, control is executed in such a manner that the inside of the furnaces 2 and 3 entirely forms a low vacuum state.

By forming a low vacuum state in the dry combustion furnace 2, the fresh air led to the dry combustion furnace 2 to be heated slowly passes the respective dry chambers 15, 15*b*, 15*d* and 15*f*, and the combustion chamber 17 while repeating the circulation. Further, this fresh air heats the raw refuse or the sludge accommodated in the same chambers 15, 15*b*, 15*d*, 15*f* and 17. The hot air having passed the dry combustion furnace 2 is led into the kiln furnace 3 via the smoke leading tube 29 to heat the raw refuse or the sludge accommodated in the kiln furnace 3. Fermentation is carried out by rotating the cylindrical body 31 by the kiln furnace 3.

"Heat-retaining Fermentative Degradation Step 104"

The raw refuse and the sludge accommodated in the respective dry chambers 15, 15*b*, 15*d* and 15*f* and the combustion chamber 17 are kept warm at a temperature suitable for microbes or fungus existing in the raw refuse or the sludge to be activated by appropriately continuously driving the heating burner 20*a* of the dry combustion furnace 2 and also appropriately continuously driving the blowers 39, 52 and 80. The microbes or fungus are bred to ferment or degrade the raw refuse or the sludge. Of course the microbes or fungus for advancing fermentation/degradation can be put in the respective dry chambers 15, 15*b*, 15*d* and 15 and the combustion chamber 17. When the vacuum state is formed to absorb the air for ventilation, the air can be evenly taken in with respect to the raw refuse, the sludge and others which are the object to be incinerated, thereby accelerating the fermentation/degradation.

"Deodorization Step 105"

The fermentation odor and the degradation odor are subjected to the combustion process by driving the burner 37 of the first smoke feeding portion 4 and the burner 50 of the second smoke feeding portion 7 or the smoke combustion portion 5 shown in FIG. 3, 4, 5 or 6 or driving the burner 79 of the smoke feeding portion 77 shown in FIG. 7. The deodorized gas is exhausted from the flue 53 of the second smoke feeding portion 7 to the outside of the multifunctional disposal apparatus 1 or 1*a*. Here, the dust filter device 46 of the dust filter portion 6 is not used. The opening/closing valve 44*a* of the gas flue 44 is closed and the opening/closing valve 45*a* of the gas flue 45 is opened so that the gas to be exhausted is bypassed from the smoke combustion portion 5 to the second smoke feeding portion 7.

"Disposal Object Fetch Step 106"

The object to be disposed such as the raw refuse or the sludge accommodated in the dry combustion furnace 2 can be taken out from the doors 16, 16*a* and 18 upon completion of fermentation/degradation using the microbes or bacteria. The object to be disposed such as the raw refuse or the sludge accommodated in the kiln furnace 3 can be raked into the storage chamber 33 to be accommodated or fetched.

The object of disposal taken out from the doors 16, 16*a* and 18 or the storage chamber 33 can be processed in any other processing step, and the disposal object obtained from the raw refuse or the sludge can be of course used as fertilizers for a plow land or a fruit farm, a kitchen garden, a wadi and others or feeding stuffs for domestic animals such as a pig. Further, it can be accommodated in the dry combustion furnace 2 and incinerated as a burnable garbage later.

FIG. 9 is a flowchart showing a method for pyrolyzing the general garbage or the incinerated ash by using the multifunctional disposal apparatus according to the present invention. The disposal method in this example pyrolyzes harmful substances such as harmful gases, e.g., NOx, COx, SOx and dioxins contained in the general garbage or the incinerated ash and the like including the raw refuse or the sludge at an extremely high temperature to be nontoxic.

"Refuse Input Process 111"

The raw refuse or the sludge is inputted from the raw refuse/sludge input portion 13 provided to the dry combustion furnace 2 of the multifunctional disposal apparatus 1 or 1*a* shown in FIG. 2 or FIG. 6 into the first dry chamber 15, and the general garbage or the incinerated ash is inputted from the input opening 14*a* of the general garbage input portion 14.

The incinerated ash can be inputted from the doors 16, 16*a* and 18 into the respective dry chambers 15, 15*d* and 15*f* or the combustion chamber 17, or the incinerated ash remaining in the ash pan 17c may be left as it is because it can be degraded. Moreover, the raw refuse or the sludge can be evenly accommodated in the respective dry chambers 15, 15b, 15d and 15f by swiveling the dry plate 15a and the respective grating plates 15c, 15e and 15g.

"Heating Process 112"

The heating burner 20a provided to the lower portion of the dry incinerator 2 shown in FIGS. 2 and 3 is ignited, or the heat radiator 68 shown in FIG. 6 is driven. At the same time, the opening/closing valve 58a of the air supplying tube 58 of the air heating portion 8 shown in FIG. 3, FIG. 5 or FIG. 6 is closed, and the opening/closing valve 61b of the air cooling tube 61 of the cooling tank portion 9 and the opening/closing valve 22a of the air supplying tube 22 of the dry combustion furnace 2 are opened.

The fresh air is taken from the air cooling tube 61 to be led from the air supplying tube 22 into the dry combustion furnace 2. The cooling tank portion 9 may or may not be operated. The fresh air taken into the dry combustion furnace 2 is heated by heat of the heating burner 20a radiated from the heat radiation tube 20b. The hot air obtained by the heating burner 20a passing through the heat radiation tube 20b is radiated and then passes through the exhaust tube 21 to be emitted into the air intake box 11a.

"Suction Step 113"

The blower 39 of the first smoke feeding portion 4 or the blower 52 of the second smoke feeding portion 7 shown in FIG. 3, 5 or 6 are driven, or the blower 80 of the smoke feeding portion 77 shown in FIG. 7 is driven so that the inside of the dry combustion furnace 2 and that of the kiln furnace 3 form a vacuum. Any one or some of the respective blowers 39, 52 and 80 may be driven or all of them may be driven.

When the inside of the dry combustion furnace 2 forms a vacuum, the fresh air led into the dry combustion furnace 2 to be heated passes through the respective dry chambers 15, 15b, 15d and 15f and the combustion chamber 17 and heats the raw refuse or the sludge accommodated in the respective dry chambers 15, 15b, 15d and 15f and the general garbage or the incinerated ash accommodated in the combustion chamber 17. At this time, the dust filter device 46 of the dust filter portion 6 is not used. The opening/closing valve 44a of the gas flue 44 is closed and the opening/closing valve 45a of the gas flue 45 is opened so that the gas to be exhausted from the smoke combustion portion 5 is bypassed to the second smoke feeding portion 7.

"Sealing Process 114"

When the dry combustion furnace 2 is uniformly warmed (approximately 300° C. to 500° C.), driving the respective blowers 39, 52 and 80 is stopped. Also, the opening/closing valve 29a of the smoke leading tube 29 and the opening/closing valve 22a of the air supplying tube 22 shown in FIG. 2, 3, 5 or 6 are closed so that the inside of the dry combustion furnace 2, i.e., the respective dry chambers 15, 15b, 15d and 15f and the combustion chamber 17 are completely sealed.

"Pyrolysis Process 115"

When completely sealed, the inside of the dry combustion furnace 2 contains a large amount of unburned gas and unburned carbon generated at a high temperature and lacks oxygen to be in the reduced atmosphere. Under the reduced atmosphere, the harmful substances such as carbon monoxide and dioxins can be prevented from being generated, and the density of oxygen is extremely thin under the reduced atmosphere. When further applying heating and pyrolyzing at a temperature of not less than 450° C., the dioxins become nontoxic, and a nitrogen oxide, a sulfur oxide and a hydrogen chloride are pyrolyzed, thereby reducing an amount of the harmful substances such as dioxins, NOx, SOx, HCL and others contained in the gas generated due to pyrolysis.

"Disposal Object Fetch Process 116"

The disposal object such as a general garbage or an incinerated ash containing a raw refuse and a sludge accommodated in the dry combustion furnace 2 can be taken out from the doors 16, 16a and 18 upon pyrolysis under the reduced atmosphere.

The disposal object taken out from the doors 16, 16a and 18 can be processed in any other processing step, and the disposal object obtained from the raw garbage or the sludge can be of course used as fertilizers for a plow land or a fruit farm, a kitchen garden, a wadi and others or feeding stuffs for domestic animals such as a pig. Further, it can be accommodated in the dry combustion furnace 2 and incinerated as a burnable garbage later.

FIG. 10 is a flowchart showing the method for applying the low-temperature drying process to the raw refuse or the sludge by using the multifunctional disposal apparatus according to the present invention shown in FIG. 10. The disposal method of this example dries the raw refuse or the sludge at a low temperature without generating the odor.

"Cooling Tank Portion Operating Step 121"

Water, rain water or others is first inputted into the water tank 59 of the cooling tank portion 9 shown in FIG. 5 from the input opening 59a provided to the water tank 59, and water is reserved while regulating the input by using the opening/closing valve 59b. In a heavy snowfall area, snow, ice and others may be reserved and the reserved snow, ice and others may be inputted from the input opening 59a.

By utilizing the night power or utilizing power obtained from wind power generation, turbine power generation, solar power generation and others, the freezing machine 63 is driven to produce a frost ice 62a in the water tank 59 by the endothermic tube 62. Cooling down the inside of the water tank 59 causes the fresh air passing through the air leading tube 60 and the air cooling tube 61 to be cooled and dried. In particular, the fresh dried cold air passing through the air cooling tube 61 is led into the dry combustion furnace 2 via the air supplying tube 22. When the freezing machine is driven by using the night power to utilize the ice thermal storage, the cold blast can be used in the daytime.

"Refuse Input Step 122"

The raw refuse or the sludge is inputted into the first dry chamber 15 from the input opening 13a of the raw refuse/sludge input portion 13 provided to the dry combustion furnace 2 of the multifunctional disposal apparatus 1 or 1a shown in FIG. 2 or 6. The dry plate 15a and the respective grating plates 15c, 15e and 15g are swiveled or rotated so that the raw refuse or the sludge can be evenly accommodated in the respective dry chambers 15, 15b, 15d and 15f.

The raw refuse or the sludge may be inputted from the doors 16 and 16a of the dry combustion furnace 2 into the respective dry chambers 15, 15d and 15f, or the raw refuse or the sludge may be inputted from the input opening 14a of the general garbage input portion 14 or the door 18 of the combustion chamber 17. That is because, the combustion incineration disposal is not performed in the combustion chamber 17 in this processing method.

The raw refuse or the sludge may be inputted into the kiln furnace 3 from the input opening 32a of the refuse input portion 32 provided to the kiln furnace 3 shown in FIG. 3, 6 or 7. That is because the dry combustion disposal is not performed in the kiln furnace 3 in this processing method.

"Ventilation Step 123"

The opening/closing valve 58a of the air supplying tube 58 of the air heating portion 8 shown in FIG. 3, 5 or 6 is closed, and the opening/closing valve 61b of the air cooling tube 61 of the cooling tank portion 9 and the opening/closing valve 22a of the air supplying tube 22 of the dry combustion furnace 2 are opened. The fresh dried cold air passing through the air cooling tube 61 is led into the dry combustion furnace 2 via the air supplying tube 22. When leading the air into the dry combustion furnace 2, the fresh dried cold air passing through the air supplying tube 22 is cooled down to be approximately not more than 5° C. in the cooling tank portion 9 and absorbed into the furnace.

"Suction Drying Step 124"

The blower 39 of the first smoke feeding portion 4 or the blower 52 of the second smoke feeding portion 7 shown in FIG. 3, 5 or 6 is driven or the blower 80 of the smoke feeding portion 77 shown in FIG. 7 is driven so that the inside of the dry combustion furnace 2 or that of the kiln furnace 3 form a vacuum. Any one or some of the respective blowers 39, 52 and 80 may be driven or all of them may be driven.

When the inside of the dry combustion furnace 2 forms a vacuum, the fresh dried cold air led into the dry combustion furnace 2 slowly passes through the respective dry chambers 15, 15b, 15d and 15f and the combustion chamber 17 while repeating the circulation and dries and cools down the raw refuse or the sludge accommodated in the chambers 15, 15b, 15d, 15f and 17. The dried cold air having passed through the dry combustion furnace 2 is led into the kiln furnace 3 via the smoke leading tube 29 and dries and cools down the raw refuse or the sludge accommodated in the kiln furnace 3. The kiln furnace 3 rotates the cylindrical body 31 to advance drying.

"Deodorization Step 125"

The burner 37 of the first smoke feeding portion 4, the burner 50 of the second smoke feeding portion 7 or the smoke combustion portion 5 shown in FIG. 3, 4, 5 or 6 is driven, or the burner 79 of the smoke feeding portion 77 shown in FIG. 7 is driven so that the odor obtained from the inside the dry combustion furnace 2 and that of the kiln furnace 3 is subjected to combustion process. The deodorized gas is exhausted from the flue 53 of the second smoke feeding portion 7 to the outside of the multifunctional disposal apparatus 1 or 1a. Here, the dust filter device 46 of the dust filter portion 6 is not used. The opening/closing valve 44a of the gas flue 44 is closed and the opening/closing valve 45a of the gas flue 45 is opened so that the gas to be exhausted is bypassed from the smoke combustion portion 5 to the second smoke feeding portion 7.

In the low-temperature drying processing method in this example, since the odor is hardly generated at all, the burner 37 of the first smoke feeding portion 4, the burner 50 of the second smoke feeding portion 7, the smoke combustion portion 5 and the burner 79 of the smoke feeding portion 77 may not driven and the deodorization step 125 may be omitted.

"Disposal Object Fetch Step 126"

The object to be disposed such as the raw refuse or the sludge accommodated in the dry combustion furnace 2 can be taken out from the doors 16, 16a and 18 upon completion of the drying process using the cold air. The object to be disposed such as the raw refuse or the sludge accommodated in the kiln furnace 3 can be raked into the storage chamber 33 to be accommodated or fetched.

The disposal object taken out from the doors 16, 16a and 18 or the storage chamber 33 may be processed in any other process step, and the disposal object obtained from the raw refuse or the sludge can be of course used as fertilizers for a plow land or a fruit farm, a kitchen garden, a wadi and others or feeding stuffs for domestic animals such as a pig. Further, it can be accommodated in the dry combustion furnace 2 and incinerated as a burnable garbage later.

FIG. 11 is a flowchart showing the method for drying the general garbage, the raw refuse or the sludge with the heated hot air by using the multifunctional disposal apparatus according to the present invention. The disposal method by indirect hot air drying in this example dries the general garbage, the raw refuse or the sludge at a medium temperature (approximately 40° C. to 400° C.) without generating the odor.

"Refuse Input Process 131"

The raw refuse or the sludge is inputted into the first dry chamber 15 from the input opening 13a of the raw refuse/sludge input portion 13 provided to the dry combustion furnace 2 of the multifunctional disposal apparatus 1 or 1a shown in FIG. 2 or 6, and the general garbage is inputted from the input opening 14a of the general garbage input portion 14. The dry plate 15a and the respective grating plates 15c, 15e and 15g are swiveled so that the raw refuse or the sludge can be evenly accommodated in the respective dry chambers 15, 15b, 15d and 15f.

The raw refuse or the sludge may be inputted from the doors 16 and 16a of the dry combustion furnace 2 into the respective dry chambers 15, 15d and 15f, or the raw refuse or the sludge may be inputted from the input opening 14a of the general garbage input portion 14 or the door 18 into the combustion chamber 17. That is because the combustion incineration disposal is not carried out in the combustion chamber 17 in this processing method.

In addition, the raw refuse or the sludge may be inputted into the kiln furnace 3 from the input opening 32a of the refuse input portion 32 provided to the kiln furnace 3 shown in FIG. 3, 6 or 7. That is because the dry combustion disposal is not performed in the kiln furnace 3 in this processing method.

"Heating Step 132"

The heating burner 20a provided on the lower portion of the dry incinerator 2 shown in FIGS. 2 and 3 is ignited, or the heat radiator 68 of the dry combustion furnace 2 shown in FIG. 6 is driven. At the same time, the opening/closing valve 58a of the air supplying tube 58 is opened, and the opening/closing valve 61b of the air cooling tube 61 of the cooling tank portion 9 and the opening/closing valve 22a of the air supplying tube 22 of the dry combustion furnace 2 are opened. The heating burner 55 of the air heating portion 8 is not driven.

The fresh dry cold air is taken from the air cooling tube 61 and the air supplying tube 58 to be led from the air supplying tube 22 to the dry combustion furnace 2. The cooling tank portion 9 is driven and the air in the air cooling tube 61 is cooled down and dried as far as possible. The fresh dried cold air taken into the dry combustion furnace 2 is heated by heat of the heating burner 20a radiated from the heat radiation tube 20b to approximately 70° C. to 400° C. The hot air obtained by the heating burner 20a passing through the heat radiation tube 20b is heat-radiated and then exhausted to the air intake box 11a via the exhaust tube 21. Further, the heat radiation tube may be formed into a frying-pan-like shape.

"Suction Drying Step 133"

The blower 39 of the first smoke feeding portion 4 or the blower 52 of the second smoke feeding portion 7 shown in FIG. 3, 5 or 6 is driven, or the blower 80 of the smoke feeding portion 77 shown in FIG. 7 is driven so that the inside of the dry combustion furnace 2 and that of the kiln furnace 3 form a vacuum. Any one or some of the respective blowers 39, 52 and 80 may be driven or all of them may be driven.

When the inside of the dry combustion furnace 2 forms a vacuum, the fresh dried cold air led into the dry combustion furnace 2 slowly passes through the respective dry chambers 15, 15b, 15d and 15f and the combustion chamber 17 while repeating the circulation and dried and cools down the general garbage, the raw refuse or the sludge accommodated in these chambers 15, 15b, 15d, 15f and 17. The dried cold air having passed through the dry combustion furnace 2 is led into the kiln furnace 3 via the smoke leading tube 29 to dry and cool down the raw refuse or the sludge accommodated in the kiln furnace 3. The kiln furnace 3 rotates the cylindrical body 31 to perform drying.

"Deodorization Step 134"

The burner 37 of the first smoke feeding portion 4, the burner 50 of the second smoke feeding portion 7 or the smoke combustion portion 5 shown in FIG. 3, 4, 5 or 6 is driven, or the burner 79 of the smoke feeding portion 77 shown in FIG. 7 is driven so that the odor obtained from the inside of the dry combustion furnace 2 and that of the kiln furnace 3 is subjected to the combustion process. The deodorized gas is exhausted from the flue 53 of the second smoke feeding portion 7 to the outside of the multifunctional disposal apparatus 1 or 1a. Here, the dust filter device 46 of the dust filter portion 6 is not used. The opening/closing valve 44a of the gas flue 44 is closed and the opening/closing valve 45a of the gas flue 45 is opened so that the gas to be exhausted is bypassed from the smoke combustion portion 5 to the second smoke feeding portion 7.

In the indirect hot air drying process method of this example, since the odor is hardly generated at all, the deodorization step 134 may be omitted without driving the burner 37 of the first smoke feeding portion 4, the burner 50 of the second smoke feeding portion 7, the smoke combustion portion 5 and the burner 79 of the smoke feeding portion 77.

"Disposal Object Fetch Process 135"

The object to be disposed such as the general garbage, the raw refuse or the sludge can be taken out from the doors 16, 16a and 18 upon completion of the drying process using the dry hot air. The raw refuse or the sludge accommodated in the kiln furnace 3 can be raked into the storage chamber 33 to be accommodated or fetched.

The object of disposal taken out from the doors 16, 16a and 18 or the storage chamber 33 can be processed in any other process step, and the disposal object obtained from the raw refuse or the sludge can be of course used as fertilizers for a plow land or a fruit farm, a kitchen garden, a wadi and others or feeding stuffs for domestic animals such as a pig. Further, it can be accommodated in the dry combustion furnace 2 and incinerated as a burnable garbage later.

Although the indirect hot air drying process method of this example is advantageous in that the dry chamber is not odorized with the combustion gas because the air heating portion 8 is not driven, the heat efficiency is low and only a medium temperature (approximately 70° C. to 400° C.) can be obtained. Therefore, it is necessary to select the general garbage, the raw refuse or the sludge to be dried which does not contain heavy metals or toxic substances and is reusable and to input it into the dry combustion furnace 2 or the kiln furnace 3.

FIG. 12 is a flowchart showing the method for drying the general garbage, the raw refuse or the sludge with the heated hot air by using the multifunctional disposal apparatus according to the present invention. The direct hot air drying process method of this example dries the general garbage, the raw refuse or the sludge at a high temperature (approximately 400° C. to 700° C.) without generating the odor.

"Refuse Input Process 141"

The raw refuse or the sludge is inputted into the first dry chamber 15 from the input opening 13a of the raw refuse input portion 13 provided to the dry combustion furnace 2 of the multifunctional disposal apparatus 1 or 1a shown in FIG. 2 or 6, and the general garbage is inputted from the input opening 14a of the general garbage input portion 14. The dry plate 15a and the respective grating plates 15c, 15e and 15g are swiveled such that the raw refuse or the sludge can be evenly accommodated in the respective dry chambers 15, 15b, 15d and 15f.

The raw refuse or the sludge may be inputted from the doors 16 and 16a of the dry combustion furnace 2 into the respective dry chambers 15, 15d and 15f, or the raw refuse or the sludge may be inputted from the input opening 14a of the general garbage input portion 14 or the door 18 into the combustion chamber 17. That is because the disposal by combustion incineration is not performed in the combustion chamber in this processing method.

Additionally, the raw refuse or the sludge may be inputted into the kiln furnace 3 from the input opening 32a of the refuse input portion 32 provided to the kiln furnace 3 shown in FIG. 3, 6 or 7. That is because the disposal by dry combustion is not carried out in the kiln furnace 3 in this processing method.

"Heating Step 142"

The heating burner 55 of the air drying portion 8 shown in FIG. 5 is ignited, or the heat radiator 68 of the air drying portion 8 shown in FIG. 6 is driven. At the same time, the opening/closing valve 58a of the air supplying tube 58 is opened, and the opening/closing valve 61b of the air cooling tube 61 of the cooling tank portion 9 and the opening/closing valve 22a of the air supplying tube 22 of the dry combustion furnace 2 are closed. The heating burner 20a of the dry combustion furnace 2 is not driven.

The fresh air is taken from the air tube 56, and the fresh air is heated by the heating burner 55 in the heating chamber 57. The heated air becomes a hot air to be led into the dry combustion furnace 2 through the air supplying tube 58 and the air supplying tube 22. The hot air led into the dry combustion furnace 2 is heated to a high temperature of approximately 400° C. to 700° C. when led into the dry combustion furnace 2.

"Suction Drying Step 143"

The blower 39 of the first smoke feeding portion 4 or the blower 52 of the second smoke feeding portion 7 shown in FIG. 3, 5 or 6 is driven, or the blower 80 of the smoke feeding portion 77 shown in FIG. 7 is driven so that the inside of the dry combustion furnace 2 and that of the kiln furnace 3 form a vacuum. Any one or some of the respective blowers 39, 52 and 80 may be driven or all of them may be driven.

When the inside of the dry combustion furnace 2 forms a vacuum, the hot air led into the dry combustion furnace 2 slowly passes the respective dry chambers 15, 15b, 15d and 15f and the combustion chamber 17 while repeating the circulation and dries the general garbage, the raw refuse or the sludge accommodated in these chambers 15, 15b, 15d, 15f and 17 with a hot air. Moreover, the hot air having passed through the dry combustion furnace 2 is led into the kiln furnace 3 via the smoke leading tube 29 to dry the raw refuse or sludge accommodated in the kiln furnace 3 with a hot air. The kiln furnace 3 rotates the cylindrical body 31 to perform drying.

"Deodorization Step 144"

The burner 37 of the first smoke feeding portion 4 or the burner 50 of the second smoke feeding portion 7 or the smoke combustion portion 5 shown in FIG. 3, 4, 5 or 6 is driven, or the burner 79 of the smoke feeding portion 77 shown in FIG. 7 is driven so that the odor obtained from the inside of the dry combustion furnace 2 and that of the kiln furnace 3 is subjected to the combustion process. The deodorized gas is exhausted from the flue 53 of the second smoke feeding portion 7 to the outside of the multifunctional disposal apparatus 1 or 1a. Here, the dust filter device 46 of the dust filter portion 6 is not used. The opening/closing valve 44a of the gas flue 44 is closed and the opening/closing valve 45a of the gas flue 45 is opened so that the gas to be exhausted is bypassed from the smoke combustion portion 5 to the second smoke feeding portion 7.

In the direct hot air drying process method of this example, since the odor is hardly generated at all, the deodorization step 134 may be omitted without driving the burner 37 of the first smoke feeding portion 4, the burner 50 of the second smoke feeding portion 7, the smoke combustion portion 5 and the burner 79 of the smoke feeding portion 77.

"Disposal Object Fetch Step 145"

The object of disposal such as the general garbage, the raw refuse or the sludge accommodated in the dry combustion furnace 2 can be taken out from the doors 16, 16a and 18 upon completion of the drying process using the dry hot air. The object to be disposed such as the raw refuse or the sludge accommodated in the kiln furnace 3 can be raked into the storage chamber 33 to be accommodated or fetched. The object to be disposed taken out from the doors 16, 16a and 18 or the storage chamber 33 can be processed in any other processing step or it can be accommodated in the dry combustion furnace 2 as it is and incinerated as a burnable refuse later.

In the direct hot air drying processing method of this example, the dry air is odorized with the combustion gas because the air heating portion 8 is driven, but the heat efficiency is high and a high temperature (approximately 200° C. to 500° C.) can be obtained. Therefore, the general garbage, the raw refuse or the sludge can be completely dried with the air having an extremely high temperature.

FIG. 13 is a flowchart showing the method for carbonizing the general garbage, the raw refuse or the sludge under the reduced atmosphere by using the multifunctional disposal apparatus according to the present invention. In the processing method of this example, the general garbage, the raw refuse or the sludge is burned and incinerated until it is completely carbonized while supplying a minimum amount of oxygen.

"Refuse Input Step 151"

The raw refuse or the sludge is inputted into the first dry chamber 15 from the input opening 13a of the raw refuse/sludge input portion 13 provided to the dry combustion furnace 2 of the multifunctional disposal apparatus 1 or 1a, and the general garbage is inputted from the input opening 14a of the general garbage input portion 14. The dry plate 15a and the respective grating plates 15c, 15e and 15g are swiveled so that the raw refuse or the sludge can be evenly accommodated in the respective dry chambers 15, 15b, 15d and 15f. The general garbage, the raw refuse or the sludge may be inputted into the kiln furnace 3 from the input opening 32a of the refuse input portion 32 provided to the kiln furnace 3 shown in FIG. 3, 6 or 7.

"Heating Step 152"

The heating burner 55 of the air drying portion 8 shown in FIG. 5 is ignited, or the heat radiator 68 of the air drying portion 8 shown in FIG. 6 is driven. At the same time, the opening/closing valve 58a of the air supplying tube 58 is opened, and the opening/closing valve 61b of the air cooling tube 61 of the cooling tank portion 9 and the opening/closing valve 22a of the air supplying tube 22 of the dry combustion furnace 2 are closed.

The fresh air is taken from the air tube 56, and the fresh air is heated by the heating burner 55 in the heating chamber 57. The heated air becomes the hot air to be led into the dry combustion furnace 2 via the air supplying tube 58 and the air supplying tube 22. The hot air led into the dry combustion furnace 2 is heated to an extremely high temperature and hardly contains oxygen because of the heating burner 55.

The heating burner 20a provided to the lower portion of the dry incinerator 2 shown in FIGS. 2 and 3 is ignited, or the heat radiator 68 shown in FIG. 6 is driven. The hot air having an extremely high temperature taken into the dry combustion furnace 2 is heated by heat of the heating burner 20a radiated from the heat radiation tube 20b. The hot air obtained by the heating burner 20a which passes through the heat radiation tube 20b is exhausted into the air intake box 11a via the exhaust tube 21 after heat radiation. Also, the heat radiation tube may be formed in to a frying-pan-like shape.

"Smoke Combustion Step 153"

The burner 37 of the first smoke portion 4, the burner 50 of the second smoke feeding portion 7 or the smoke combustion 5 shown in FIG. 3, 4, 5 or 6 is driven, or the burner 79 of the smoke feeding portion 77 shown in FIG. 7 is driven so that the harmful substances contained the odor and the flue gas obtained from the inside of the dry combustion furnace 2 and that of the kiln furnace 3 are subjected to the combustion process. The gas subjected to the smoke combustion process is exhausted from the flue 53 of the second smoke feeding portion 7 to the outside of the multifunctional disposal apparatus 1 or 1a. Here, the dust filter device 46 of the dust filter portion 6 may or may not be used. When the dust filter device 46 is not used, the opening/closing valve 44a of the gas flue 44 is closed, and the opening/closing valve 45a of the gas flue 45 is opened so that the gas to be exhausted is bypassed from the smoke combustion portion 5 to the second smoke feeding portion 7.

"Suction Process 154"

The blower 39 of the first smoke feeding portion 4 or the blower 52 of the second smoke feeding portion 7 shown in FIG. 3, 4, 5 or 6 is driven or the blower 80 of the smoke feeding portion 77 shown in FIG. 7 is driven so that the inside of the dry combustion furnace 2 or that of the kiln furnace 3 forms a vacuum. Any one or some of the respective blowers 39, 59 and 80 may be driven or all of them may be driven.

When the inside of the dry combustion furnace 2 forms a vacuum, the hot air led into the dry combustion furnace 2 slowly passes through the respective dry chambers 15, 15b, 15d and 15f and the combustion chamber 17 while repeating the circulation and dries the general garbage, the raw refuse or the sludge accommodated in these chambers 15, 15b, 15d, 15f and 17 with the hot air. Further, the hot air having passed through the dry combustion furnace 2 is led into the kiln furnace 3 via the smoke leading tube 29 to dry the raw refuse or the sludge accommodated in the kiln furnace 3 with a hot air. The kiln furnace 3 rotates the cylindrical body 31 for drying.

By driving the blowers 39, 52 and 80, the a vortex flow of exhaust and a flame formed log are generated in the cyclone furnaces 35, 48 and 78 of the respective smoke feeding portion 4, 7 and 77 so that the harmful substances contained in the odor and the flue gas can be subjected to the combustion process.

"Carbonization Step 155"

Driving the heating burner 55 of the air drying portion 8 shown in FIG. 5 and driving the heat radiator 68 of the air drying portion 8 shown in FIG. 6 are continued, and driving the blower 39 of the first smoke feeding portion 4 or the blower 52 of the second smoke feeding portion 7 shown in FIG. 3, 5 or 6 or driving the blower 80 of the smoke feeding portion 77 shown in FIG. 7 is continued. Furthermore, driving the heating burner 20a of the dry incinerator 2 shown in FIG. 2 or 3 or driving the heat radiator 68 shown in FIG. 6 is continued to maintain the inside of the dry combustion furnace 2 and that of the kiln furnace 3 at an extremely high temperature.

When the inside of the furnace is heated to a high temperature of approximately 300° C. to 500° C. where the general garbage, the raw refuse or the sludge is ignited or molten under the reduced atmosphere, the opening/closing valve 22a of the air supplying tube 22 of the dry combustion furnace 2 is completely closed, and the opening/closing valve 29a of the smoke leading tube 29 is closed with a small gap.

Then, the general garbage, the raw refuse or the sludge exposed to the high-temperature hot air whose density of oxygen is thin from the start is carbonized in the reduced atmosphere. Only the exhaust is carried out by a vacuum, and such a refuse is streamed and baked in the respective dry chambers 15, 15b, 15d and 15f, the combustion chamber 17 and the kiln furnace 3. That is, the general garbage, the raw refuse or the sludge is first dried with a hot air having a medium temperature of 300° C. to 500° C., it is thereafter partially ignited and a small amount of oxygen is taken in. The air is intercepted upon completion of intake of the overall unburned gas.

"Disposal Object Fetch Step 156"

The object of disposal such as the general garbage, the raw refuse or the sludge which is accommodated in the dry combustion furnace 2 can be taken from the doors 16, 16a and 18 after the carbonization is completed. The object of disposal such as the raw refuse or the sludge accommodated in the kiln furnace 3 can be raked into the storage chamber 33 to be accommodated or fetched. The object of disposal taken out from the doors 16, 16a and 18 or the storage chamber 33 can be processed in any other processing step or accommodated in the dry combustion furnace 2 as it is to be disposed by incineration as a burnable garbage later.

FIG. 14 is a flowchart showing the method for disposing the general garbage, the raw refuse or the sludge 4, 10 by incineration in the reduced atmosphere by using the multifunctional disposal apparatus according to the present invention. The processing method of this example disposes the general garbage, the raw refuse or the sludge by combustion without generation harmful gases or substances.

"Refuse Input Step 161"

The raw refuse or the sludge is inputted into the first dry chamber 15 from the input opening 13a of the raw refuse/ sludge input opening 13 provided to the dry combustion furnace 2 of the multifunctional disposal apparatus 1 or 1a shown in FIG. 2 or 6, and the general garbage is inputted from the input opening 14a of the general garbage input portion 14. The dry plate 15a, the respective grating plates 15c, 15e and 15g are swiveled so that the raw refuse or the sludge is evenly accommodated in the respective dry chambers 15, 15b, 15d and 15f. Further, the general garbage, the raw refuse or the sludge may be inputted into the kiln furnace 3 from the input opening 32a of the garbage input portion 32 provided to the kiln furnace 3 shown in FIG. 3, 6 or 7.

"Heating Step 162"

The heating burner 55 of the air drying portion 8 shown in FIG. 5 is ignited, or the heat radiator 68 of the air drying portion 8 shown in FIG. 6 is driven. At the same time, the opening/closing valve 58a of the air supplying tube 58 and the opening/closing valve 22a of the air supplying tube 22 of the dry combustion furnace 2 are opened, and the opening/closing valve 61b of the air cooling tube 61 of the cooling tank portion 9 is closed.

The fresh air is taken from the air supplying tube 56, and the fresh air is heated by the heating burner 55 in the heating chamber 57. The heated air becomes a hot air to be led into the dry combustion furnace 2 via the air supplying tube 58 and the air supplying tube 22.

The heating burner 20a provided to the lower portion of the dry incinerator 2 shown in FIG. 2 or 3 is ignited, or the heat radiator 68 shown in FIG. 6 is driven. The hot air having an extremely high temperature taken into the dry combustion furnace 2 is heated by heat of the heating burner 20a radiated from the heat radiation tube 20b. The hot air obtained by the heating burner 20a which passes through the heat radiation tube 20a is heat-radiated to be then exhausted to the air intake box 11a through the exhaust tube 21. Further, the heat radiation tube 20b may be formed into a frying-pan-like shape.

"Smoke Combustion Step 163"

The burner 37 of the first smoke feeding portion 4, the burner 50 of the second smoke feeding portion 7 or the smoke combustion portion 5 shown in FIG. 3, 4, 5 or 6 is driven, or the burner 79 of the smoke feeding portion 77 shown in FIG. 7 is driven so that the odor, the flue gas and the harmful substances contained in the flue gas obtained from the inside of the dry combustion furnace 2 and that of the kiln furnace 3 are disposed by combustion. The gas subjected to the smoke combustion process is exhausted from the flue 53 of the second smoke feeding portion 7 to the outside of the multifunctional disposal apparatus 1 or 1a.

The smoke containing harmful substances generated from the dry combustion furnace 2 is subjected to the catalytic combustion to be nontoxic in the smoke combustion portion 5 to be supplied to the second smoke feeding portion 7.

"Suction Filtering Step 164"

The blower 39 of the first smoke feeding portion 4 or the blower 52 of the second smoke feeding portion 7 shown in FIG. 3, 5 or 6 is driven, or the blower 80 of the smoke feeding portion 77 shown in FIG. 7 is driven so that the inside of the dry combustion furnace 2 and that of the kiln furnace 3 form a vacuum. Any one or some of the respective blowers 39, 52 and 80 may be driven, or all of them may be driven.

Furthermore, since the regular combustion step is carried out in this processing method and the harmful gases and substances are contained in the smoke, the dust filter device 46 of the dust filter portion 6 is used. When the dust filter device 46 is used, the opening/closing valve 44a of the gas flue 44 is opened and the opening/closing valve 45a of the gas flue 45 is closed so that the gas exhausted from the dry combustion furnace 2 and the kiln furnace 3 is led into the dust filter device 46. In case of processing dioxins, a nitrogen oxide, a sulfur oxide, a hydrogen chloride, funnel fumes contained in the exhaust, the exhaust is caused to pass through the dust filter device (a bug filter, an electric dust collector, a thermal catalyst, a calcium hydroxide, an activated carbon and others, a calcium oxide) 46, and the odor in the exhaust is subjected to the combustion processing by activating the burners 37 and 50 and the thermal catalytic device 39.

"Combustion Step 165"

The general garbage, the raw refuse or the sludge accommodated in the combustion chamber 17 of the dry combustion furnace 2 and the kiln furnace 3 is ignited. When the inside of the dry combustion furnace 2 forms a vacuum, the hot air led into the dry combustion furnace 2 slowly passes through the respective dry chambers 15, 15b, 15d and 15f and the combustion chamber 17 while repeating the circulation and burns the general garbage, the raw refuse or the sludge accommodated in these chambers 15, 15b, 15d, 15f and 17. Further, the hot air having passed through the dry combustion furnace 2 is led into the kiln furnace 3 via the smoke leading tube 29 to burn the raw refuse or the sludge accommodated in the kiln furnace 3. The kiln furnace 3 rotates the cylindrical body 31 to advance the dry combustion.

Driving the blowers 39, 52 and 80 generates a vortex flow of the exhaust and an elongated flame in the cyclone furnaces 35, 48 and 78 of the respective smoke feeding portions 4, 7 and 77 so that the odor, the flue gas and the harmful substances contained in the flue gas can be subjected to combustion process. "Disposal Object Fetch Process 166"

The object of disposal such as the general garbage, the raw refuse or the sludge accommodated in the dry combustion furnace 2 can be taken out from the doors 16, 16a and 18 upon completion of the drying process using the dry hot air. The object of disposal such as the raw refuse or the sludge accommodated in the kiln furnace 3 can be raked into the storage chamber 33 to be accommodated or fetched.

The object of disposal taken out from the doors 16, 16a and 18 or the storage chamber 33 can be processed in any other processing step, and the disposal object obtained from the raw refuse or the sludge can be of course used as fertilizers for a plow land or a fruit farm, a kitchen garden, a wadi and others or feeding stuffs for domestic animals such as a pig. Further, it can be accommodated in the dry combustion furnace 2 and incinerated as a burnable garbage later.

"Cooling Step 167"

The waste heat obtained from the combustion chamber 17 of the dry combustion furnace 2 is supplied to the freezing machine 63 of the cooling tank portion 9 via the circulation tube 30 to drive the freezing machine 63 so that the liquid reserved in the water tank 59 is cooled down by an endothermic tube 62.

The fresh air passing through the air leading tube 60 inserted into the water tank is cooled down by cooling the water tank 59, and the high-temperature exhaust in the cyclone furnaces 35, 48 and 78 can be extremely rapidly cooled down with the ejector effect when the cold air is blown from the blowers 39, 52 and 80 of the respective smoke feeding portions 4, 7 and 77 to the tube ends 40a, 53a and 81a of the gas flues 40 and 81 or the flue 53.

Additionally, the cooling water of the water tank 59 is used to cool down the circulation tube 64 inserted into a cooling apparatus and the like, and the cold air or the cold water can be used for the cooling apparatus other than the multifunctional disposal apparatus 1 and 1a. In a heavy snowfall area, snow, ice or cold water may be reserved in a water reservoir or tank and an appropriate amount of it may be inputted into the input opening 59a of the water tank 59 according to need.

FIG. 15 is a flowchart showing a method for melting expanded polystyrene, polymer-based substances and others by using the multifunctional disposal apparatus according to the present invention. The processing method of this example converts expanded polystyrene, polymer-based substances and others into a solid matter to be reusable without generating harmful gases or harmful substances.

"Expanded Polystyrene Input Process 171"

The expanded polystyrene/polymer-based substance 27 is accommodated in the melting tank 26 of the melting device 10 of the multifunctional disposal apparatus shown in FIG. 2.

"Heating Step 172"

The heating burner 55 of the air drying portion 8 shown in FIG. 5 is ignited, or the heat radiator 68 of the air drying portion 8 shown in FIG. 6 is driven. At the same time, the opening/closing valve 58a of the air supplying tube 58 is opened, and the opening/closing valve 61b of the air cooling tube 61 of the cooling tank portion 9 and the opening/closing valve 22a of the air supplying tube 22 of the dry combustion furnace 2 are closed.

"Melting Step 173"

The opening/closing valves 25a and 28a provided to the air supplying tube 25 and the exhaust tube 28 connected to the upper and lower portions of the melting device 10 are opened to lead the hot air of the heating burner 55 from the air supplying tube 25. The expanded polystyrene 27 accommodated in the melting tank 26 is molten by the hot air, and the liquefied polystyrene and the polymer-based substance permeate and the grating of the grating plate 26a and penetrate to be dropped on the pan 26b.

"Fetch Step 174"

The pan 26b accommodated in the melting tank 26 is taken out from the melting tank 26. The molten liquid polystyrene, the polymer-based substance and others are reusable. The hot air that molten down the expanded polystyrene 27, the polymer-based substance and others passes through the gas flue 28 to be led into the gas flue 47. It is then defused in the second smoke feeding portion 7 to be emitted from the flue 53 to the outside of the multifunctional disposal device 1.

Figure 16:
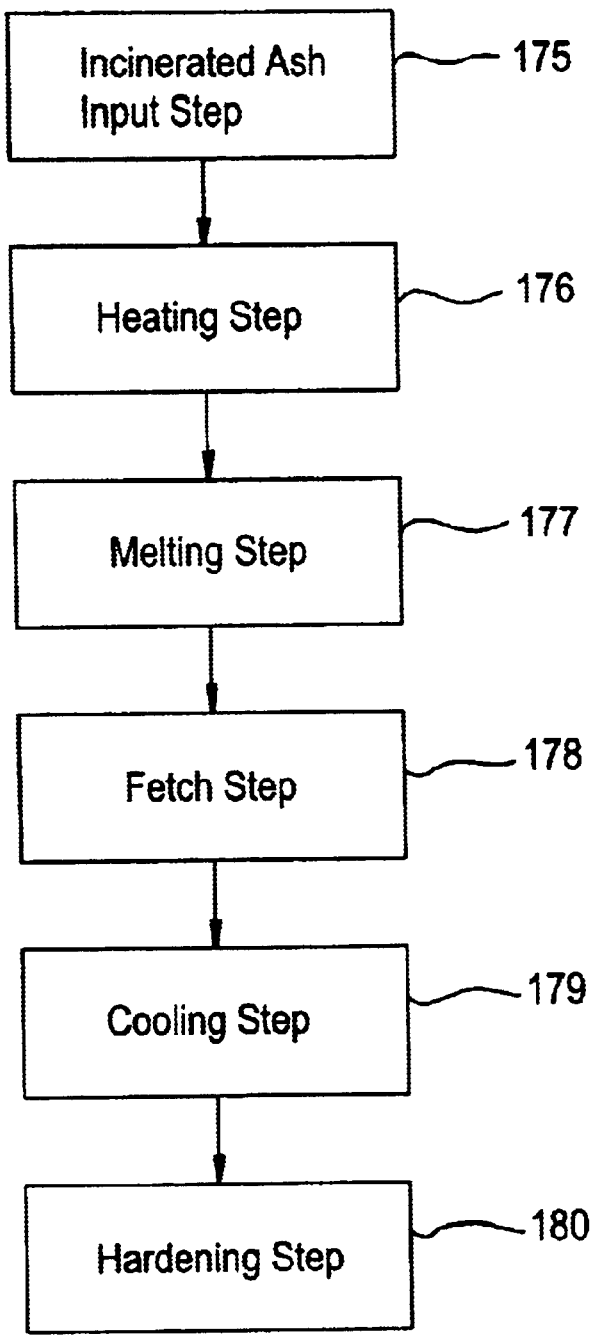

FIG. 16 is a flowchart showing the method for melting the incinerated ash by using the multifunctional disposal apparatus according to the present invention. The processing method of this example converts the incinerated ash into a solid matter to be reusable.

"Incinerated Ash Input Step 175"

The incinerated ash is inputted to the crucible 74 mounted on the fire brick 74b in the ash melting furnace 72 of the ash melting portion 7 of the multifunctional disposal apparatus 1 shown in FIG. 2.

"Heating Step 176"

The heating burner 73 set on the ahs melting portion 72 shown in FIG. 7 is ignited to be heated to a high temperature of approximately 1300° C. to 1800° C. The high temperature is obtained by heat stored in the crucible 74 and the inner wall of the crucible 74. That is, when bricks and the like are put around the crucible 74, it is possible to obtained a high temperature by the effect of thermal storage. Setting bricks, casters and others around the crucible 74 can obtain a high temperature. Further, since a tip of the burner 73 is so set to face upwards, the flame spirally evenly heats the outer peripheral surface of the crucible 74, thereby heating at a high temperature. Moreover, heating at a high temperature is enabled by simultaneously incinerating the exhaust gas absorbed and inflowing from the heating burner 73 and the kiln furnace 3 and the incinerated ash.

At this time, when the exhaust gas absorbed and inflowing from the kiln furnace 3 or the dry incineration furnace 2 is burned, the exhaust gas is reduced and the unburned gas is simultaneously burned. Therefore, the high temperature incineration can be performed by mixed combustion, which is advantageous in the countermeasure for the exhaust gas.

"Melting Step 177"

The incinerated ash which has been inputted into the crucible 74 to have a high temperature of 1300° C. to 1800° C. is molten to puddle. That is, glass, lava and others are molten.

"Fetch Step 178"

The cover 72a is opened to see that glass, lava and others are molten in the crucible 74, and they are then taken out.

"Cooling Step 179"

The incinerated ash taken out from the crucible 74 is cooled down by using the cooling water or the air.

"Hardening Step 180"

When the meltage is hardened by applying the cooling water thereto or using the air, it is hardened into a shape like an irregular marble. Such a hardened incinerated ash can be mixed into gravels for building materials or cement to be reused.

Figure 17:
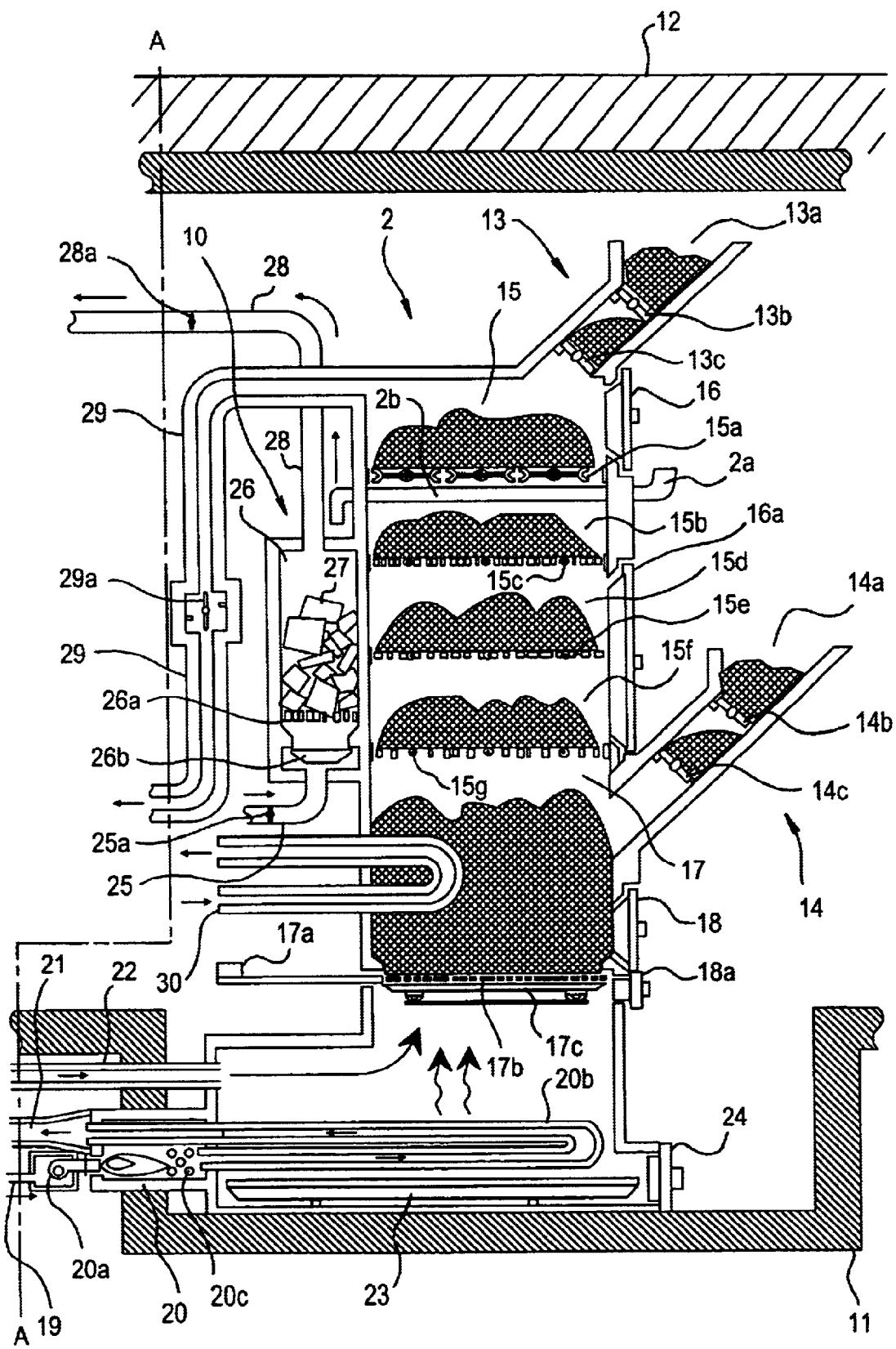
FIG. 17 is a partial cross-sectional view showing still another embodiment of a multifunctional disposal apparatus in which a cylindrical tube for drying is provided to a drying chamber.

FIG. 17 is a partial cross-sectional view of another embodiment of the multifunctional disposal apparatus according to the present invention, showing the state where a cylindrical tube is set in the dry chamber. That is, as shown in FIG. 17, a drying device 2a is installed in the second dry chamber 15b. This is a device which passes the raw refuse, the general garbage, the sludge and others through the drying device 2a and indirectly dries them by combustion heat generated from the combustion chamber 17. This drying device 2a may be installed in any of the respective dry chambers 15, 15b and 15d.

Figure 18:
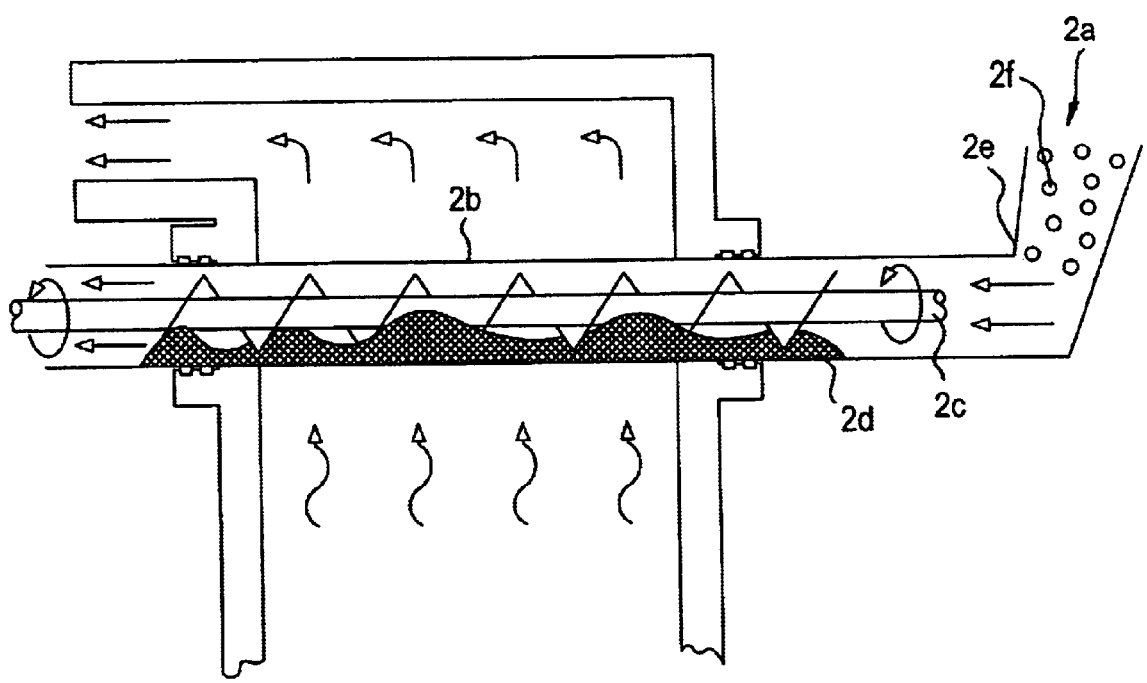
FIG. 18 is a cross-sectional view showing attachment of the cylindrical tube for drying illustrated in FIG. 17.

FIG. 18 is a cross sectional view showing attachment of the drying device illustrated in FIG. 17. As shown in FIG. 18, a screw conveyer 2c is rotatably set in the drying cylindrical tube 2b to which the input opening 2e is formed, and the drying device 2a is heated by high heat of the combustion chamber 17 to perform drying while the raw refuse, the general garbage, the sludge and others 2f inputted from the input opening 2e are transferred by the screw conveyer 2c.

Figure 19:
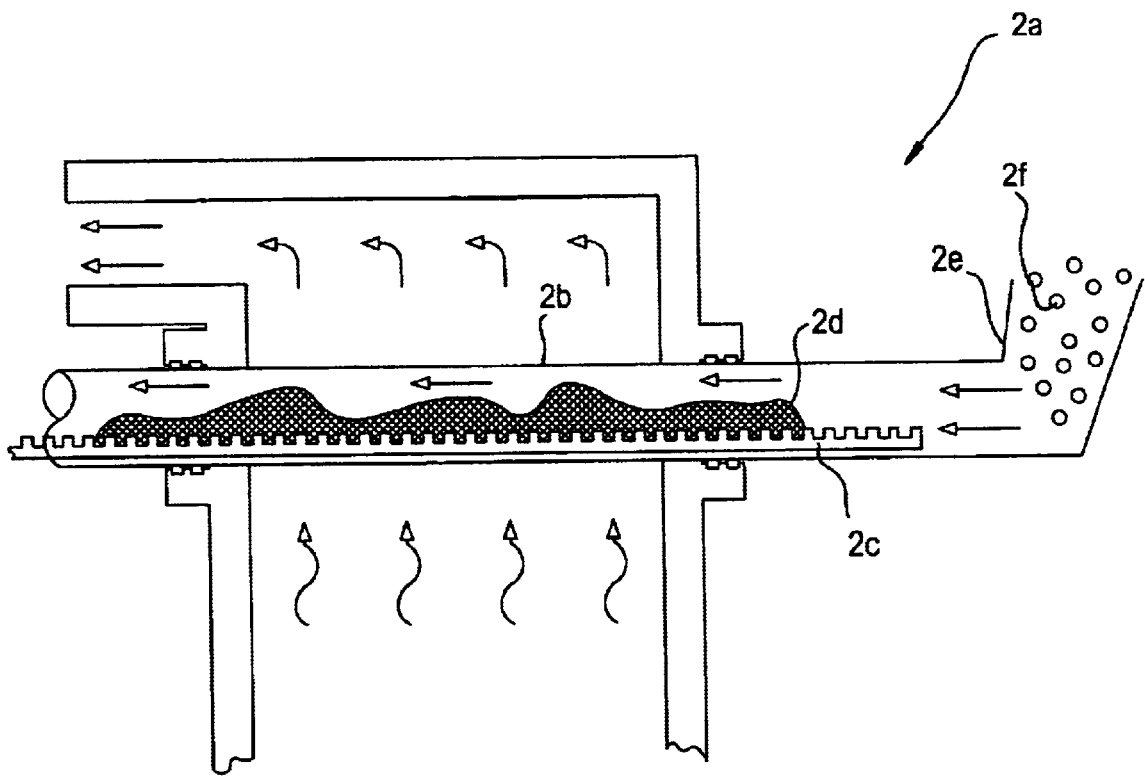
FIGS. 19 and 20 are cross-sectional views showing still another embodiment of the cylindrical tube for drying.

FIG. 19 is a cross sectional view showing another embodiment of the drying device. In the drying device 2a of this example, the raw refuse, the general garbage, the sludge and others 2f inputted from the input opening 2e are moved by using a belt conveyer 2g in the drying cylindrical tube 2b instead of using the screw conveyer 2b. Irregularities are formed on the surface of the belt conveyer 2g. These irregularities facilitate transfer of the object to be dried 2d.

Figure 20:
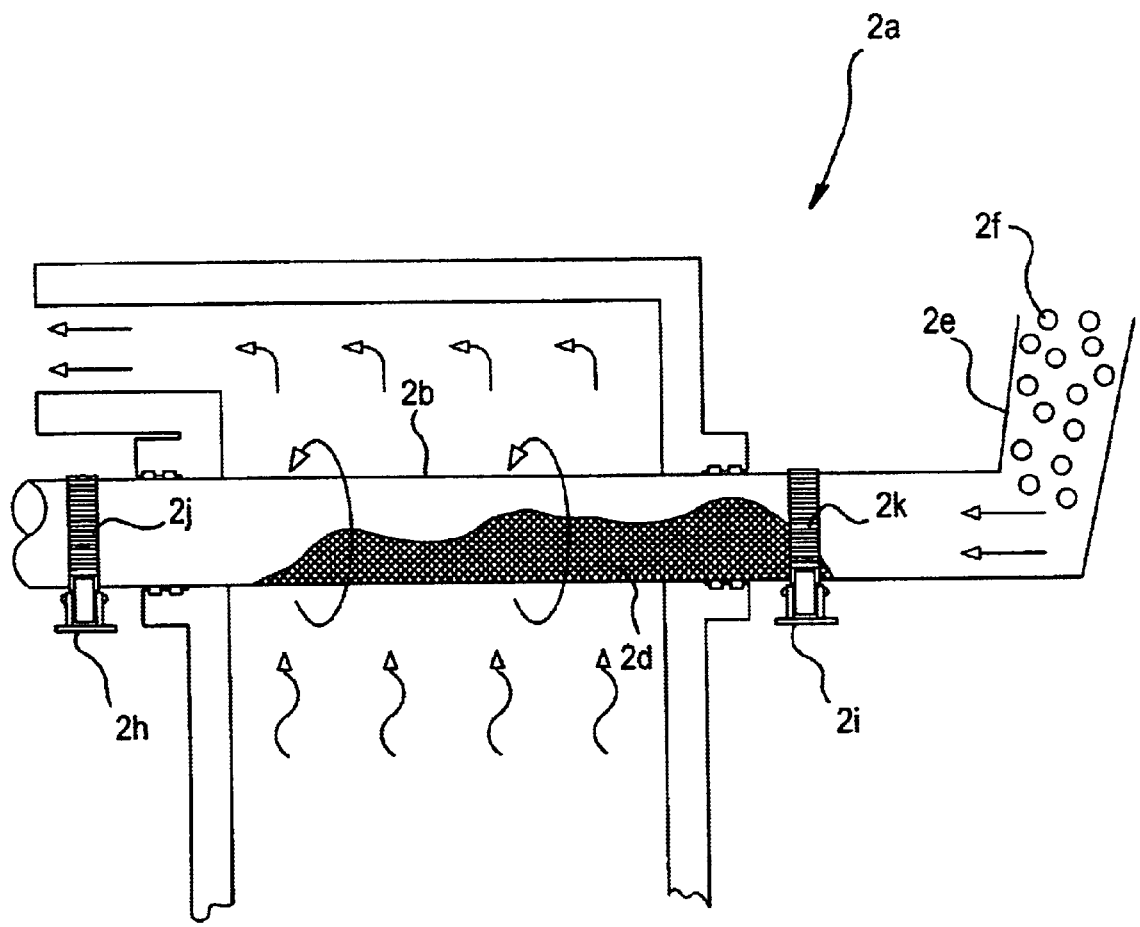

FIG. 20 is a cross-sectional view showing still another embodiment of the drying device. In the drying device 2a of this example, gearing belts 2j and 2k are attached in the horizontal direction of the drying cylindrical tube 2b, and drive wheels 2h and 2i are provided at positions where the gearing belts 2j and 2k are engaged. When the drive wheels 2h and 2i rotate, the drying cylindrical tube 2b rotates, and the object to be dried 2d in the drying cylindrical tube 2b moves toward the drive wheel 2h on the left side. Irregular grooves are spirally formed on the inner peripheral surface of the drying cylindrical tube 2b, and the object to be dried 2d is hence moved.

Figure 21:
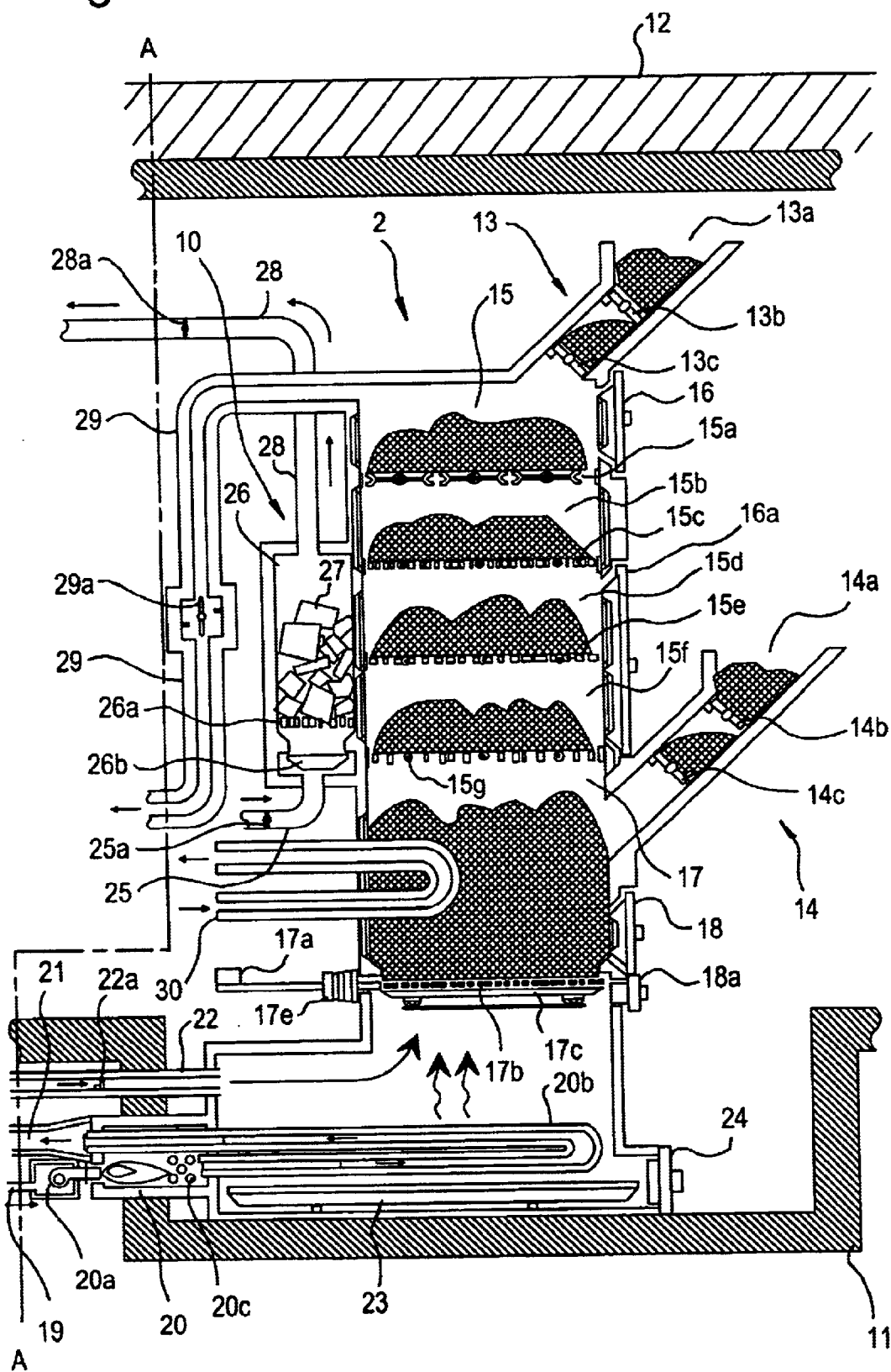
FIG. 21 is a partial cross-sectional view showing yet another embodiment of the cylindrical tube for drying.
Figure 25:
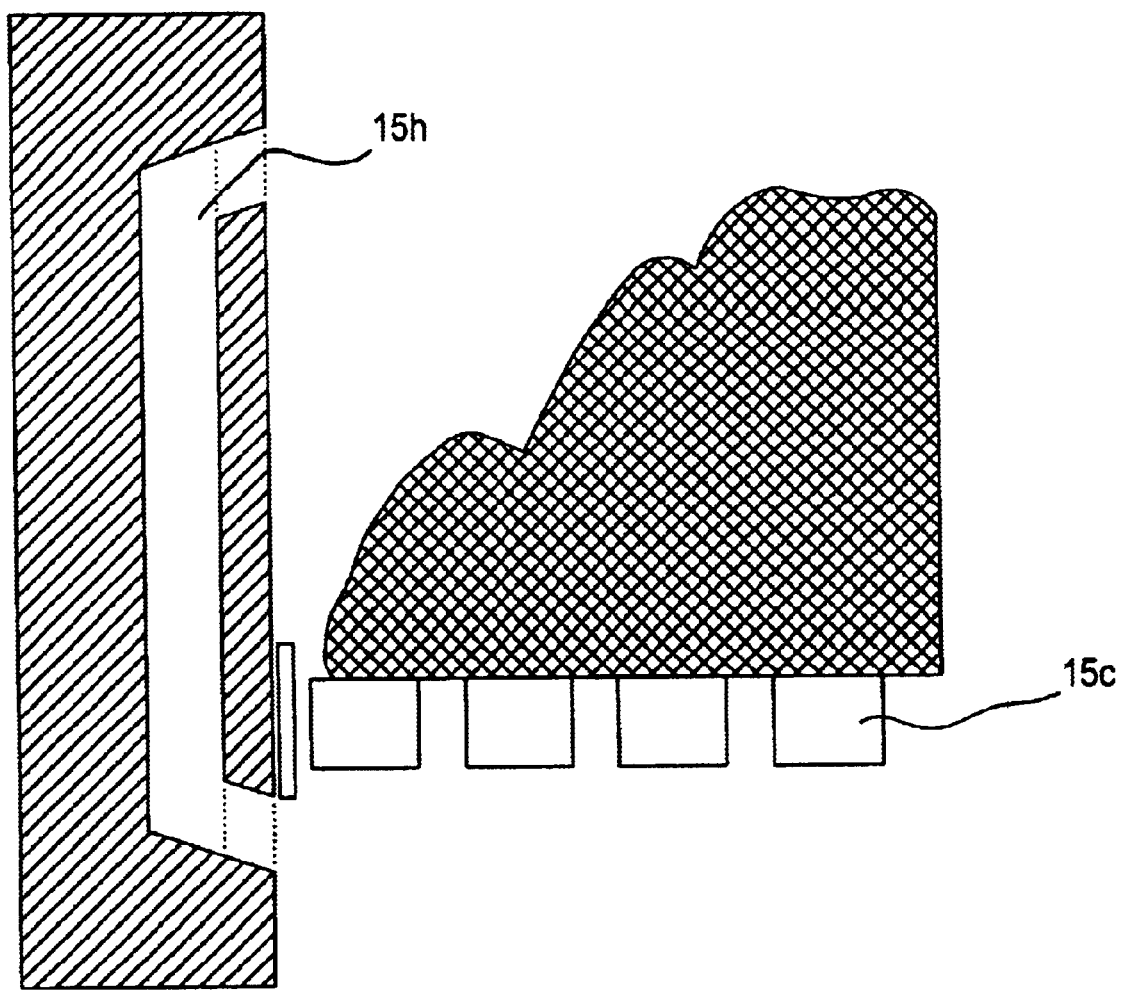
FIG. 25 is an enlarged view showing an air hole illustrated in FIG. 21.

FIG. 21 is a partial cross-sectional view showing a further embodiment of the multifunctional disposal apparatus according to the present invention. In the multifunction disposal apparatus of this example, a plurality of air holes 15h are formed on the inner surface of the respective dry chambers 15, 15a, 15d and 15f and the combustion chamber 17, a check valve 22a is provided in the air supplying tube 22. Further, a sealing member 17e is attached to a shaft of a vibrator 17a. Attaching the sealing member 17e does not cause heat of the combustion chamber 17e to be diffused. As shown in FIG. 25, the air hole 15h is formed in the longitudinal direction.

Figure 22:
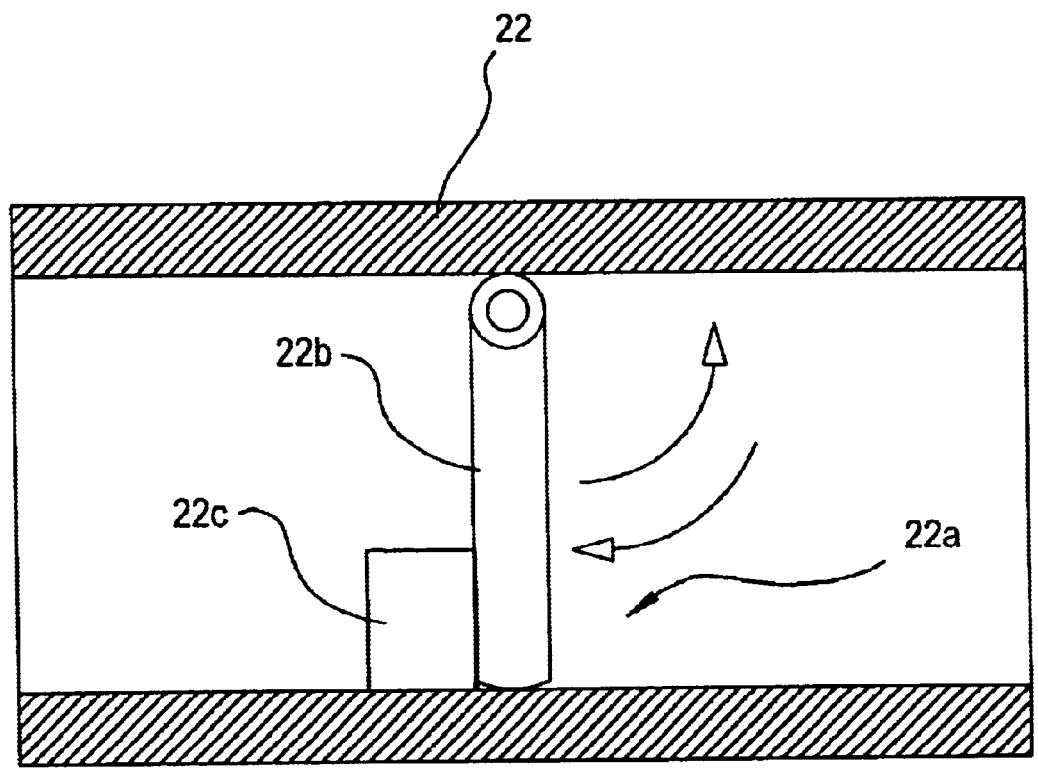
FIG. 22 is a longitudinal sectional view of a check valve attached in FIG. 21, showing the check value being closed.

FIG. 22 is a longitudinal cross-sectional view of the check valve attached in FIG. 21, showing the closed state thereof. As shown in FIG. 22, the check valve 22a is constituted by a valve 22b and a stopper 22c. That is, the valve 22b is provided so as to be capable of swiveling in the air supplying tube 22 as indicated by an arrow, and the stopper 22c is fixed to the lower left position of the valve 22b. When the valve 22b is in such a state, air supply is stopped in the air supplying tube 22.

Figure 23:
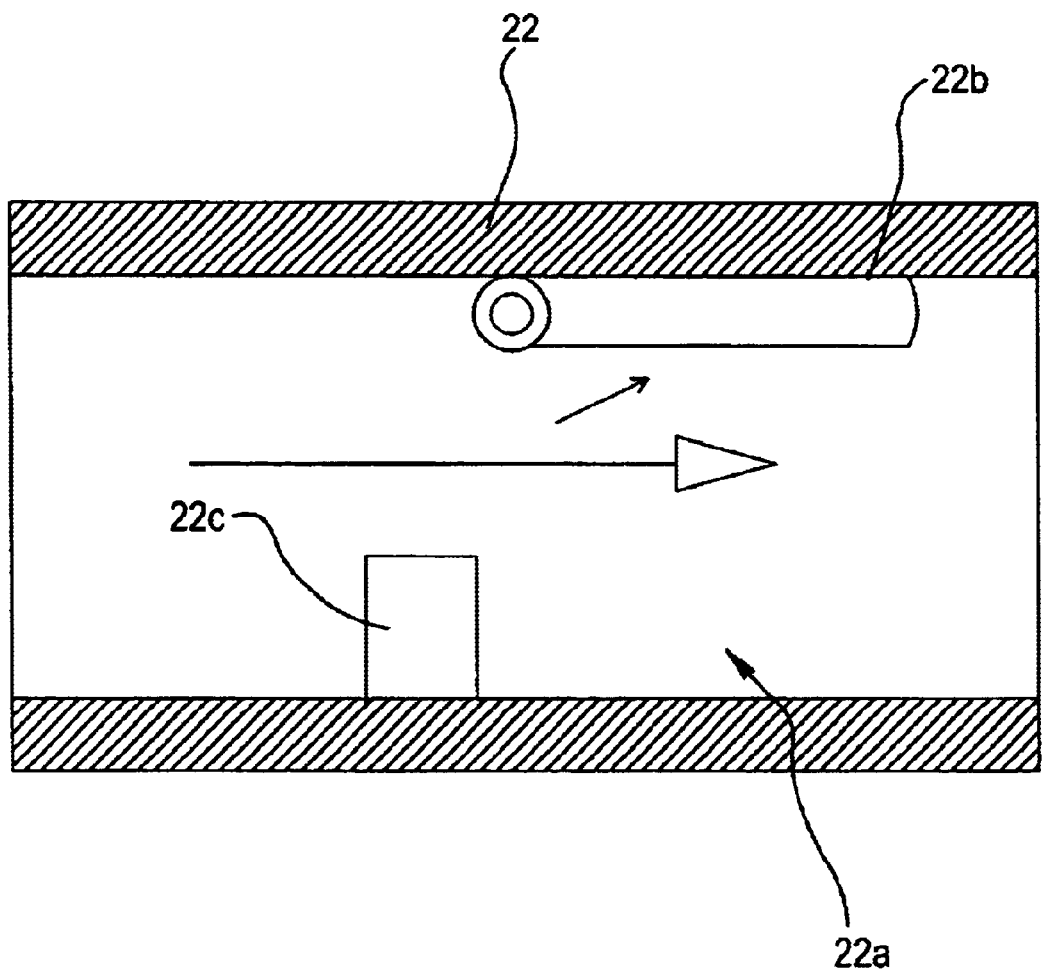
FIG. 23 is a longitudinal sectional view of the check valve attached in FIG. 21, showing the check valve being opened.

FIG. 23 is a longitudinal cross-sectional view of a check valve attached in FIG. 21, showing the opened state thereof. As shown in FIG. 23, when the valve 22 is sealed to the inner surface of the air supplying tube 22, the air is supplied from the direction of the stopper 22c.

Figure 24:
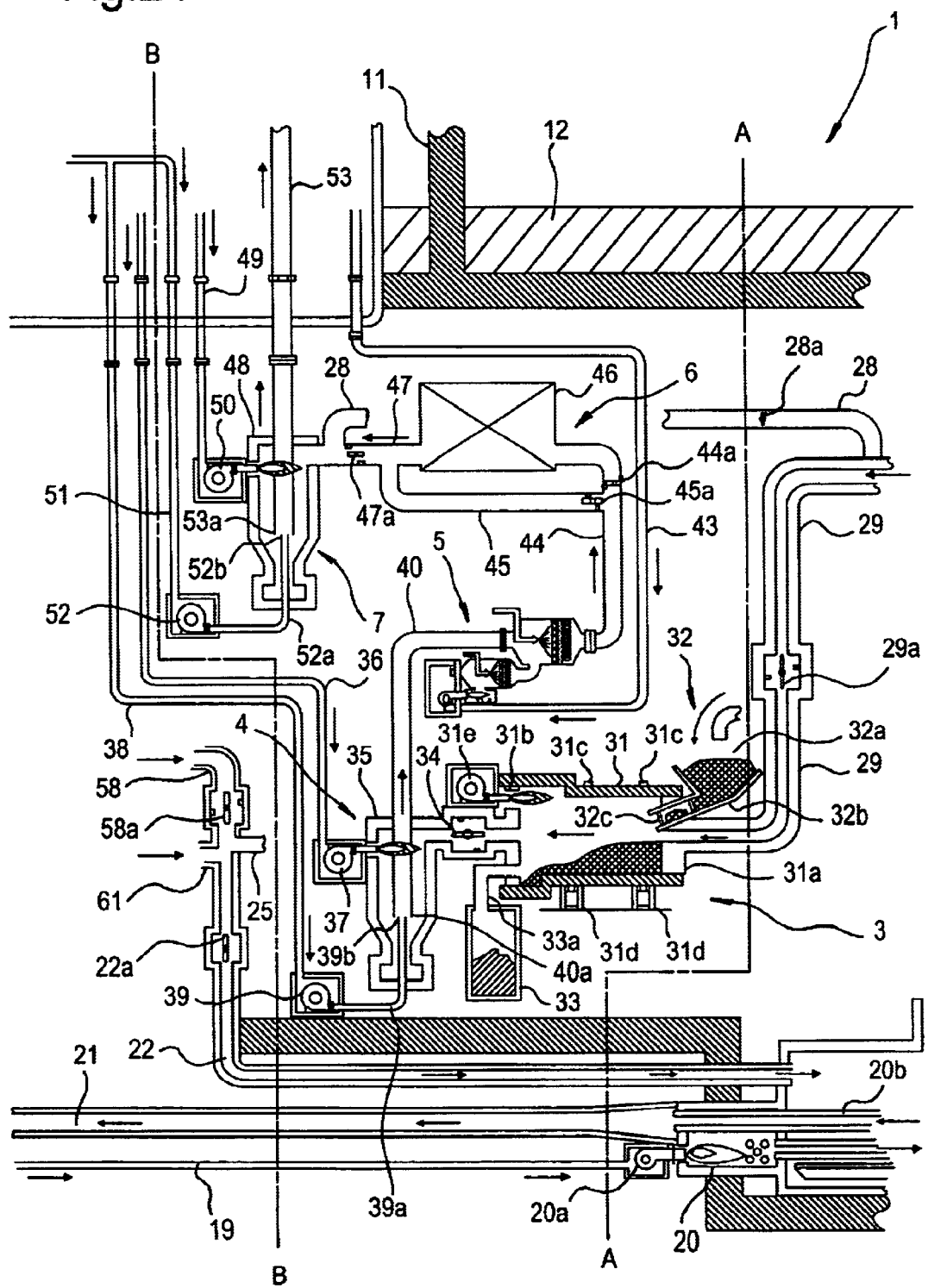
FIG. 24 is a partial cross sectional view showing a further embodiment of a multifunctional disposal apparatus according to the present invention.

FIG. 24 is a partial cross-sectional view showing a still further embodiment of the multifunctional disposal apparatus according to the present invention. In the multifunctional disposal apparatus of this example, a burner 31e is provided to the kiln furnace 3. In such a manner, attaching the burner 31e to the kiln furnace 3 can perform efficient drying.

POSSIBILITY OF INDUSTRIAL UTILIZATION

Since the present invention has the structure described above, the following advantages can be obtained. At first, taking usages after incineration, incineration time and others into consideration, appropriate processes can be selected to be performed without generating harmful substances.

At second, using the ejector quenching effect or the cold air drying can suppress the odor and dioxins to the maximum level.

At third, the waste heat obtained from the combustion heat generated in the combustion chamber can warm the hot air or stream, and the freezing machine and the boiler can be operated by using the waste heat to be used for air conditioning of other facilities.

At fourth, when the contamination and the burned matter containing harmful substances such as dioxins or gases are injected, the oxidative combustion and the smoke combustion can be simultaneously advanced, thereby pyrolyzing the harmful substances to be defused.

At fifth, when polymer-based substances or gases with which the combustion object can be burned at a high temperature are injected and mixed to PCBs and others so that a temperature range reaches several thousands ° C., the PCBs and others can be pyrolyzed in the reduced atmosphere to be defused.

At sixth, when the inputted combustion object defined in claims is mixed and incinerated, detoxication is enabled. Since this combustion system can incinerate pyrolyzing the dioxins and others without leaving unburned matters in the incinerated ash by combustion in the reduced atmosphere at a temperature of 450° C., dioxins and others can be pyrolyzed by mixing the residue containing a large amount of dioxins and others in the conventional incinerated matter with the waste material, the conventional incinerated ash and the soil contamination (materials containing the dioxin) to be incinerated so that the oxidative combustion and the smoke combustion are simultaneously carried out, the dioxins and other can be pyrolyzed. This incineration system does not produces dioxins by pyrolysis in the combustion process and also does not produce dioxins in the incinerated ash because it is pyrolyzed in the reduced atmosphere.

At seventh, even if the raw refuse, the sludge, the expanded polystyrene, the polymer, the general garbage and others are mixed, the incombustible material can be dried or the polymer, the polystyrene and others can be carbonized. Such processes can be stopped halfway, and drying, carbonization and incineration can be finally carried out without restraint.

When the multifunctional disposal apparatus according to the present inventions are set in parallel or in series, the operation as the continuous plant can be enabled.

What is claimed is:

1. A multifunctional disposal apparatus comprising: a dry combustion furnace having a plurality of drying chambers and one combustion chamber for drying and burning burnable substances and wet substances having a water content which is otherwise burnable in a dry state; a kiln furnace connected to the dry combustion furnace via a smoke leading tube and which burns at least one of raw refuse, sludge, general garbage; a first smoke feeding portion for pyrolyzing hot air, smoke, and gas, discharged from the kiln furnace; a smoke combustion portion for burning at a high temperature substantially harmless hot air, smoke and gas discharged from the first smoke feeding portion to completely burn said hot air, smoke and gas; a dust filter portion for filtering a combustion gas containing dust discharged from the smoke combustion portion; a second smoke feeding portion for discharging, through a funnel draft to the outside, the smoke and hot air coming through the dust filter portion; an air heating portion for adjusting a temperature of the air to be fed to the dry combustion furnace; a cooling tank portion for cooling fresh air to be fed to the dry combustion furnace, a melting device disposed adjacent to the dry combustion furnace for melting expanded polystyrene and polymer-based objects with the hot air fed from the air heating portion; and a frame body receiving the dry combustion furnace, the kiln furnace, the first smoke feeding portion, the smoke combustion portion, the dust filter portion, the second smoke feeding portion, the air heating portion, the cooling tank portion and the melting device.

2. The multifunctional disposal apparatus according to claim 1, wherein a drying device having a drying cylindrical tube is installed in a dry chamber of said dry combustion furnace in order to perform indirect drying.

3. The multifunctional disposal apparatus according to claim 1, wherein a heat radiator provided on one of a heat pipe having a parabola condenser connected to the other end thereof, and the radiator is provided in heating chambers of said dry combustion of said dry combustion chamber, said smoke combustion chamber and said air heating portion.

4. The multifunctional disposal apparatus according to claim 3, wherein a lens condenser and a parabola condenser are connected to said heat pipe.

5. The multifunctional disposal apparatus according to claim 1, wherein an ash melting furnace is provided at the rear of said kiln furnace and said dry combustion portion and a cyclone furnace is provided to said ash melting furnace.

* * * * *